United States Patent
Shigenobu et al.

[19]

[11] Patent Number: 6,130,866
[45] Date of Patent: *Oct. 10, 2000

[54] ERROR-CORRECTING STORAGE MEDIUM REPRODUCTION APPARATUS AND METHOD USING FRAMES AND SYNCHRONIZATION PATTERNS

[75] Inventors: Masahiro Shigenobu; Kensuke Fujimoto, both of Kanagawa; Hirofumi Todo, Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/887,379

[22] Filed: Jul. 2, 1997

[30] Foreign Application Priority Data

Jul. 15, 1996 [JP] Japan .................................. 8-184429

[51] Int. Cl.[7] ....................................................... G11B 7/00
[52] U.S. Cl. ................................................ 369/47; 369/48
[58] Field of Search .................................. 369/59, 48, 47, 369/58, 54, 124, 50; 360/48, 49

[56] References Cited

U.S. PATENT DOCUMENTS

| | | | |
|---|---|---|---|
| 5,285,433 | 2/1994 | Oshiba et al. | 369/44.26 |
| 5,359,584 | 10/1994 | Fukushima et al. | 369/58 |
| 5,440,474 | 8/1995 | Hetzler | 369/44.26 |
| 5,592,348 | 1/1997 | Strang | 369/44.26 |
| 5,623,467 | 4/1997 | Kato et al. | 369/48 |
| 5,629,912 | 5/1997 | Okawa et al. | 369/44.26 |
| 5,666,338 | 9/1997 | Ishizawa et al. | 369/48 |
| 5,732,066 | 3/1998 | Moriya et al. | 369/275.3 |
| 5,757,752 | 5/1998 | Sako | 369/59 |

FOREIGN PATENT DOCUMENTS

| | | |
|---|---|---|
| 0418885 A2 | 3/1991 | European Pat. Off. . |
| 0707315 A2 | 4/1996 | European Pat. Off. . |
| 0756279 A2 | 1/1997 | European Pat. Off. . |
| 0779623 A2 | 6/1997 | European Pat. Off. . |

OTHER PUBLICATIONS

H. Ooki, "Logical Format on DVD," IEEE Int'l. Conf. on Consumer Electroincs, Digest of Technical Papers, Jul. 8–7, 1996, pp. 350–351.

*Primary Examiner*—Thang V. Tran
*Attorney, Agent, or Firm*—Limbach & Limbach, LLP

[57] ABSTRACT

A storage medium reproduction apparatus for reproducing data from a storage medium for storing data which are divided into frames of a predetermined length, each of the frames comprising a synchronizing pattern. The apparatus comprises a synchronizing pattern detection circuit for detecting synchronizing patterns and a frame determination circuit for determining a currently reproduced frame on the basis of regularity of the synchronizing patterns detected by the synchronizing pattern detection circuit.

20 Claims, 23 Drawing Sheets

F I G. 3

| | | | |
|---|---|---|---|
| SY0 | ID | SY5 | |
| SY1 | | SY5 | |
| SY2 | | SY5 | |
| SY3 | | SY5 | |
| SY4 | | SY5 | |
| SY1 | | SY6 | |
| SY2 | | SY6 | |
| SY3 | | SY6 | |
| SY4 | | SY6 | |
| SY1 | | SY7 | |
| SY2 | | SY7 | |
| SY3 | | SY7 | |
| SY4 | | SY7 | |

13 ROWS

FIG. 4

STATE 1 AND 2

| | MSB | LSB | MSB | LSB |
|---|---|---|---|---|
| SY0 | 0001001001000100 | 0000000000000001 | 0001001000000100 | 0000000000010001 |
| SY1 | 0000010000000100 | 0000000000010001 | 0000010001000100 | 0000000000010001 |
| SY2 | 0001000000000100 | 0000000000010001 | 0001000001000100 | 0000000000010001 |
| SY3 | 0000100000000100 | 0000000000010001 | 0000100001000100 | 0000000000010001 |
| SY4 | 0010000000000100 | 0000000000010001 | 0010001001000100 | 0000000000010001 |
| SY5 | 0010001001000100 | 0000000000010001 | 0010001000000100 | 0000000000010001 |
| SY6 | 0010010010000100 | 0000000000010001 | 0010010000000100 | 0000000000010001 |
| SY7 | 0010010001000100 | 0000000000010001 | 0010010000000100 | 0000000000010001 |

STATE 3 AND 4

| | MSB | LSB | MSB | LSB |
|---|---|---|---|---|
| SY0 | 1001001000000100 | 0000000000010001 | 1001001001000100 | 0000000000010001 |
| SY1 | 1000010001000100 | 0000000000010001 | 1000010000000100 | 0000000000010001 |
| SY2 | 1001000001000100 | 0000000000010001 | 1001000000000100 | 0000000000010001 |
| SY3 | 1000010001000100 | 0000000000010001 | 1000010000000100 | 0000000000010001 |
| SY4 | 1000100001000100 | 0000000000010001 | 1000100001000100 | 0000000000010001 |
| SY5 | 1000100001000100 | 0000000000010001 | 1000100000000100 | 0000000000010001 |
| SY6 | 1000100001000100 | 0000000000010001 | 1000010001000100 | 0000000000010001 |
| SY7 | 1000100001000100 | 0000000000010001 | 1000100001000100 | 0000000000010001 |

FIG. 5A

| | | | |
|---|---|---|---|
| SY0 | ID | SY5 | |
| SY1 | | SY5 | |
| SY2 | | SY5 | |
| SY3 | | SY5 | |
| SY4 | | SY5 | |
| SY1 | | SY6 | |
| SY2 | | SY6 | |
| SY3 | | SY6 | |
| SY4 | | SY6 | |
| SY1 | | SY7 | |
| SY2 | | SY7 | |
| SY3 | | SY7 | |
| SY4 | | SY7 | |

13 ROWS

FIG. 5B

| | | | |
|---|---|---|---|
| 0 | | 1 | |
| 2 | | 3 | |
| 4 | | 5 | |
| 6 | | 7 | |
| 8 | | 9 | |
| 10 | | 11 | |
| 12 | | 13 | |
| 14 | | 15 | |
| 16 | | 17 | |
| 18 | | 19 | |
| 20 | | 21 | |
| 22 | | 23 | |
| 24 | | 25 | |

13 ROWS

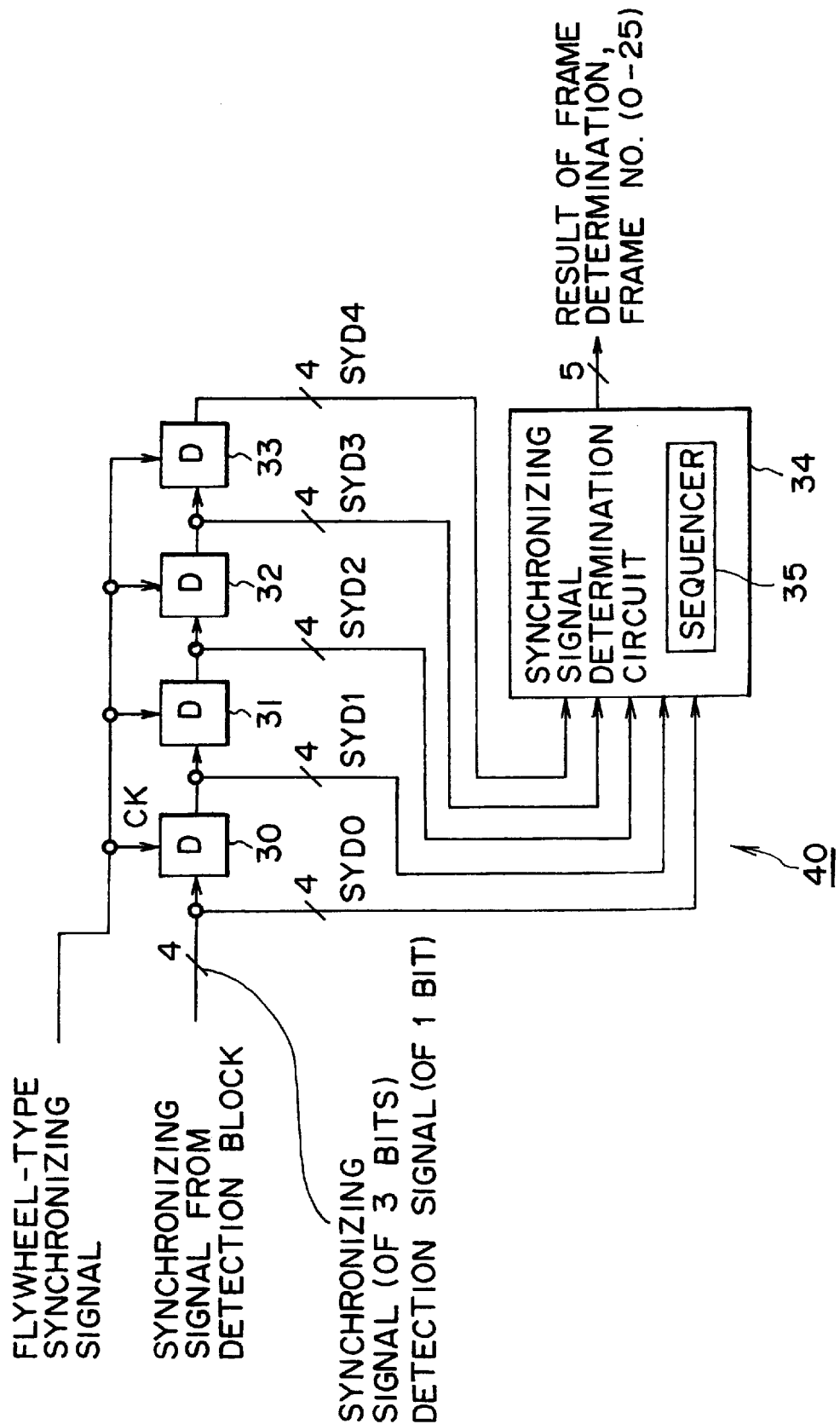

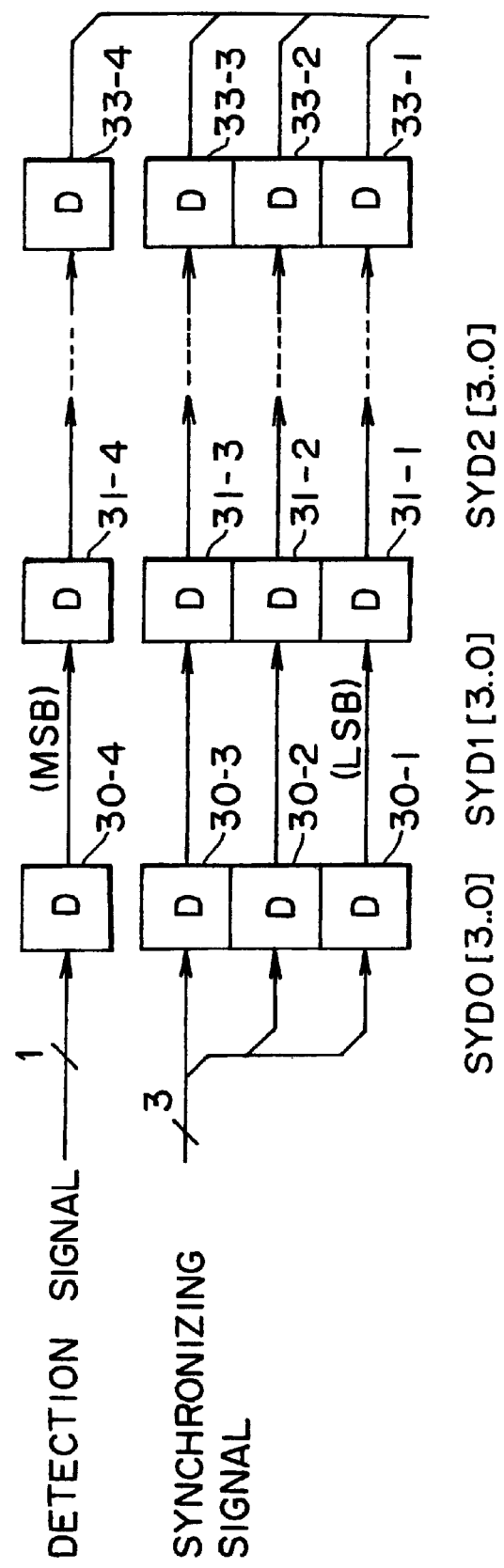

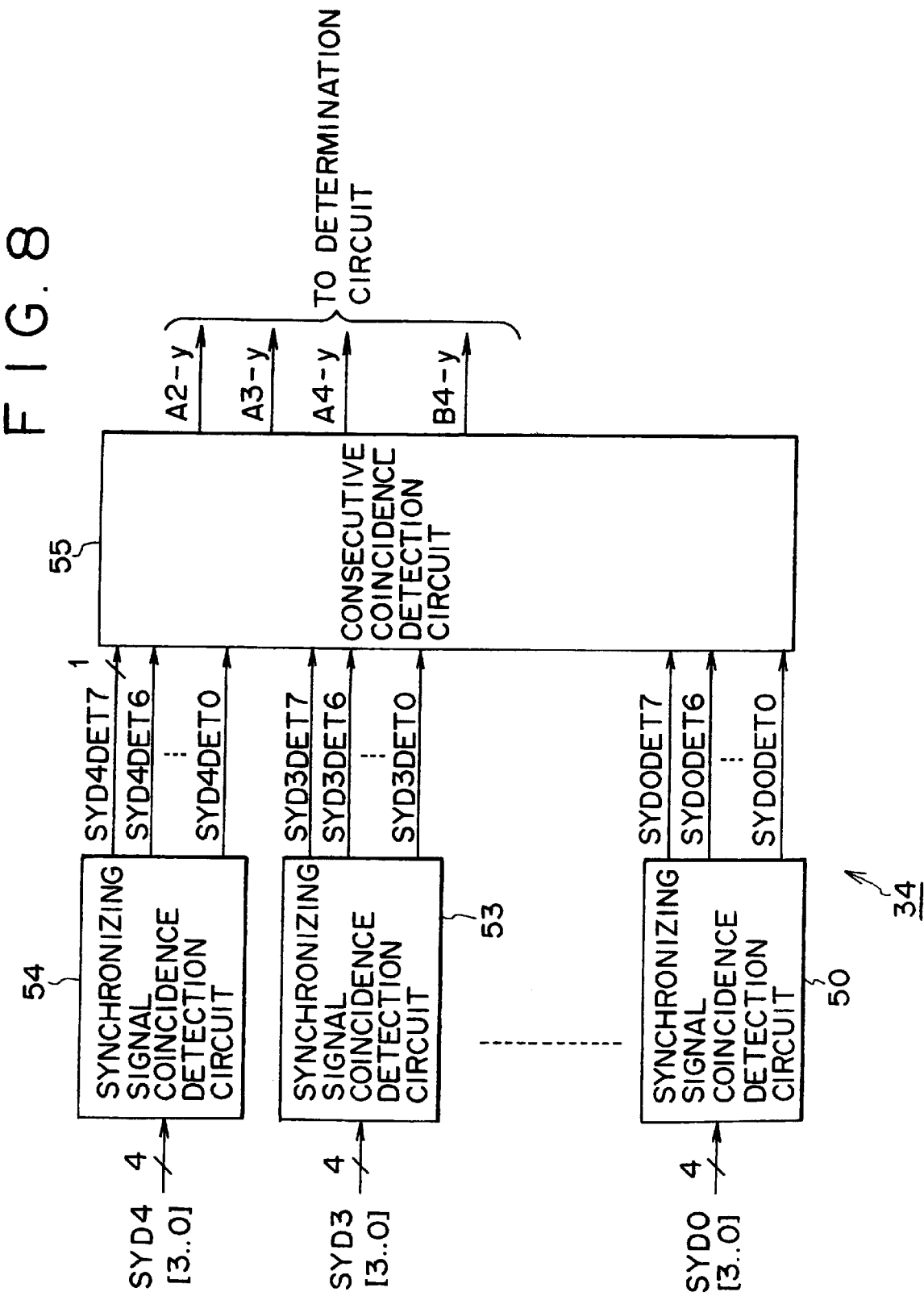

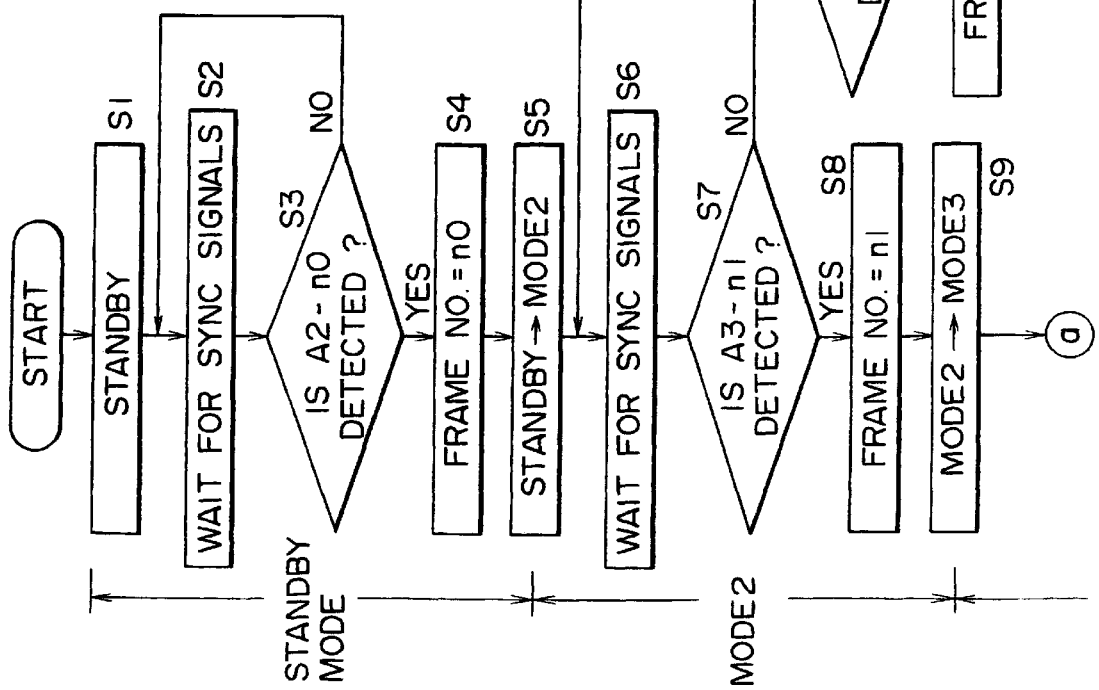

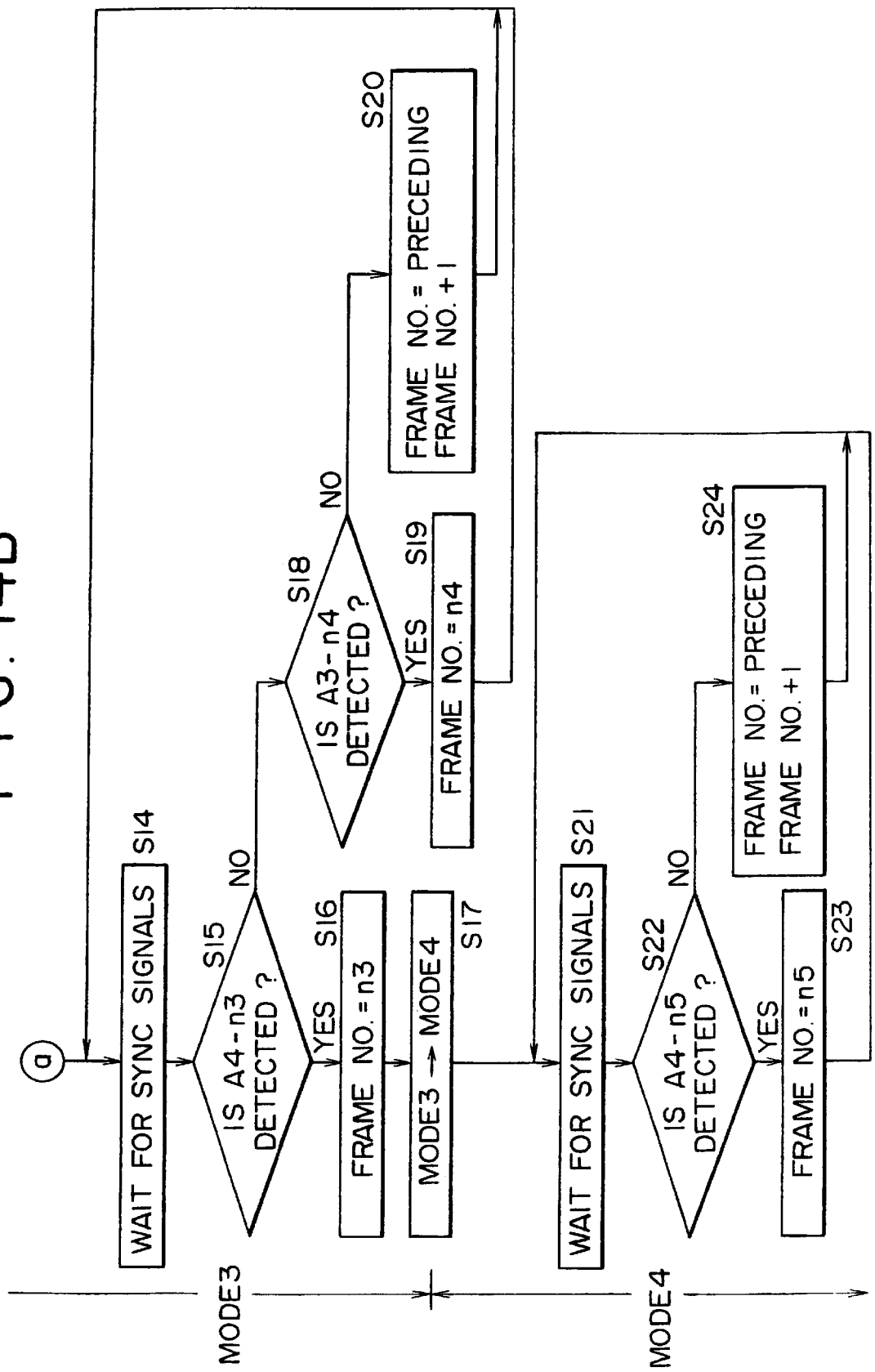

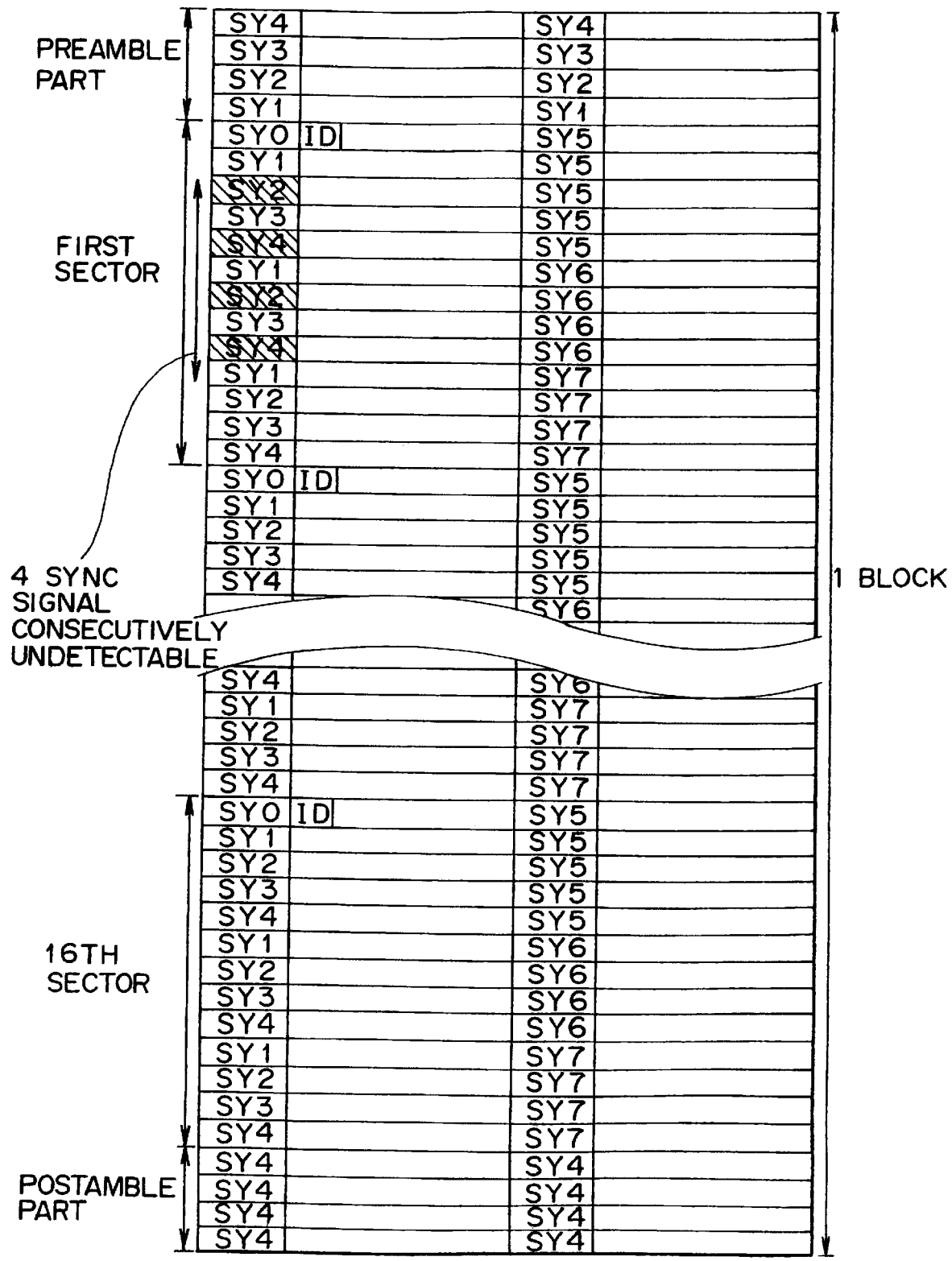

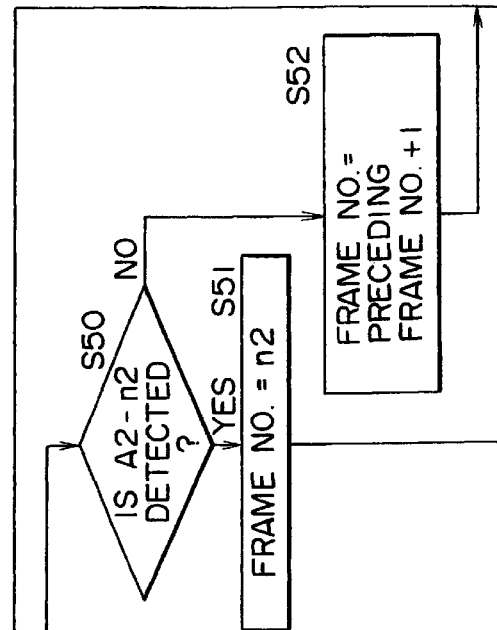
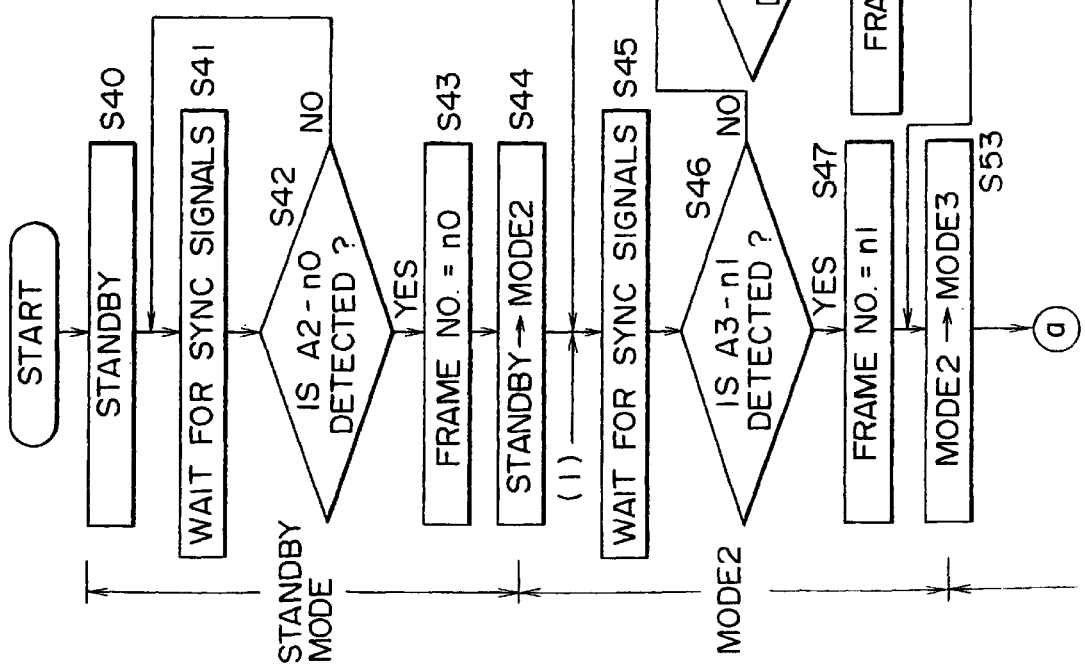
FIG. 17A

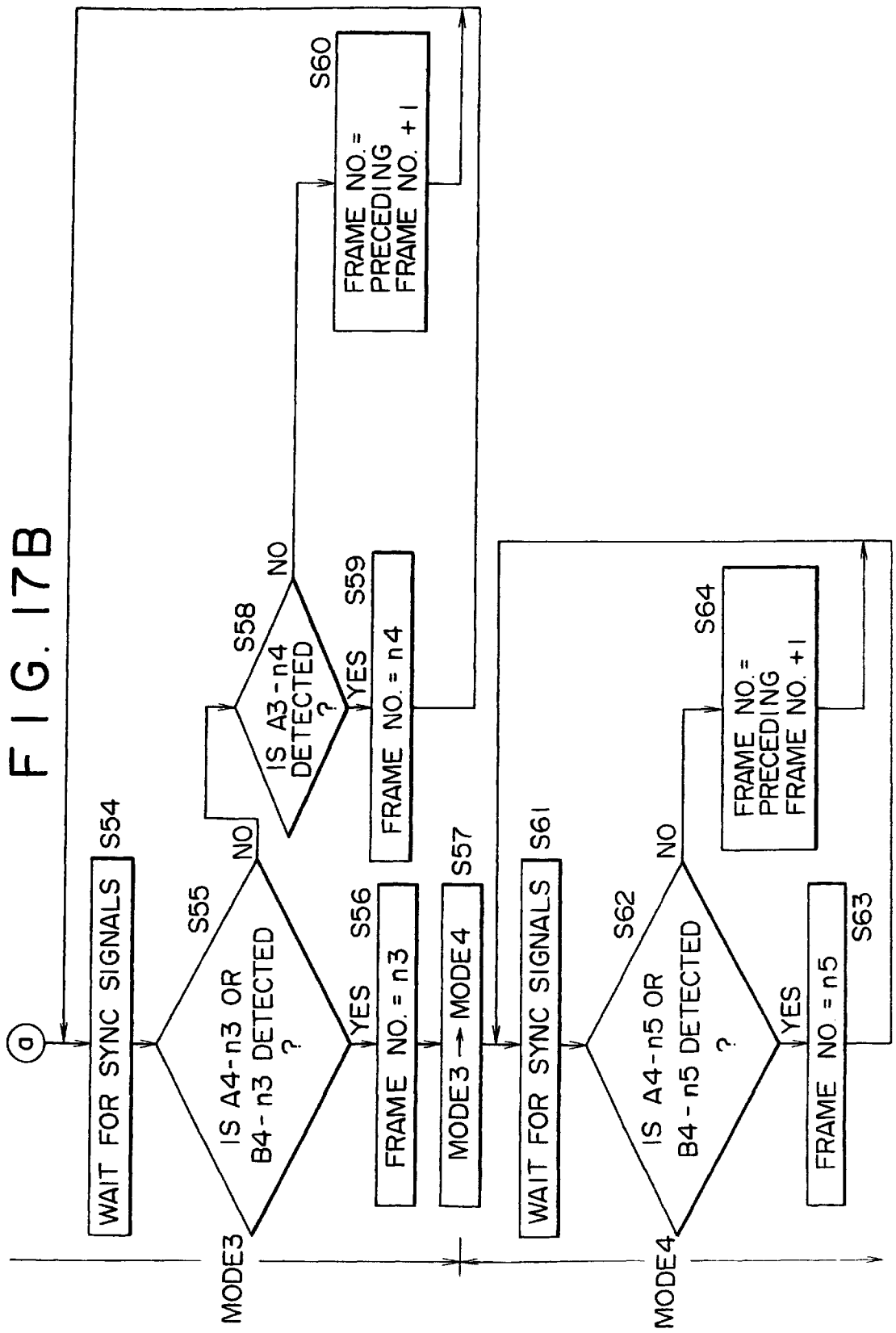

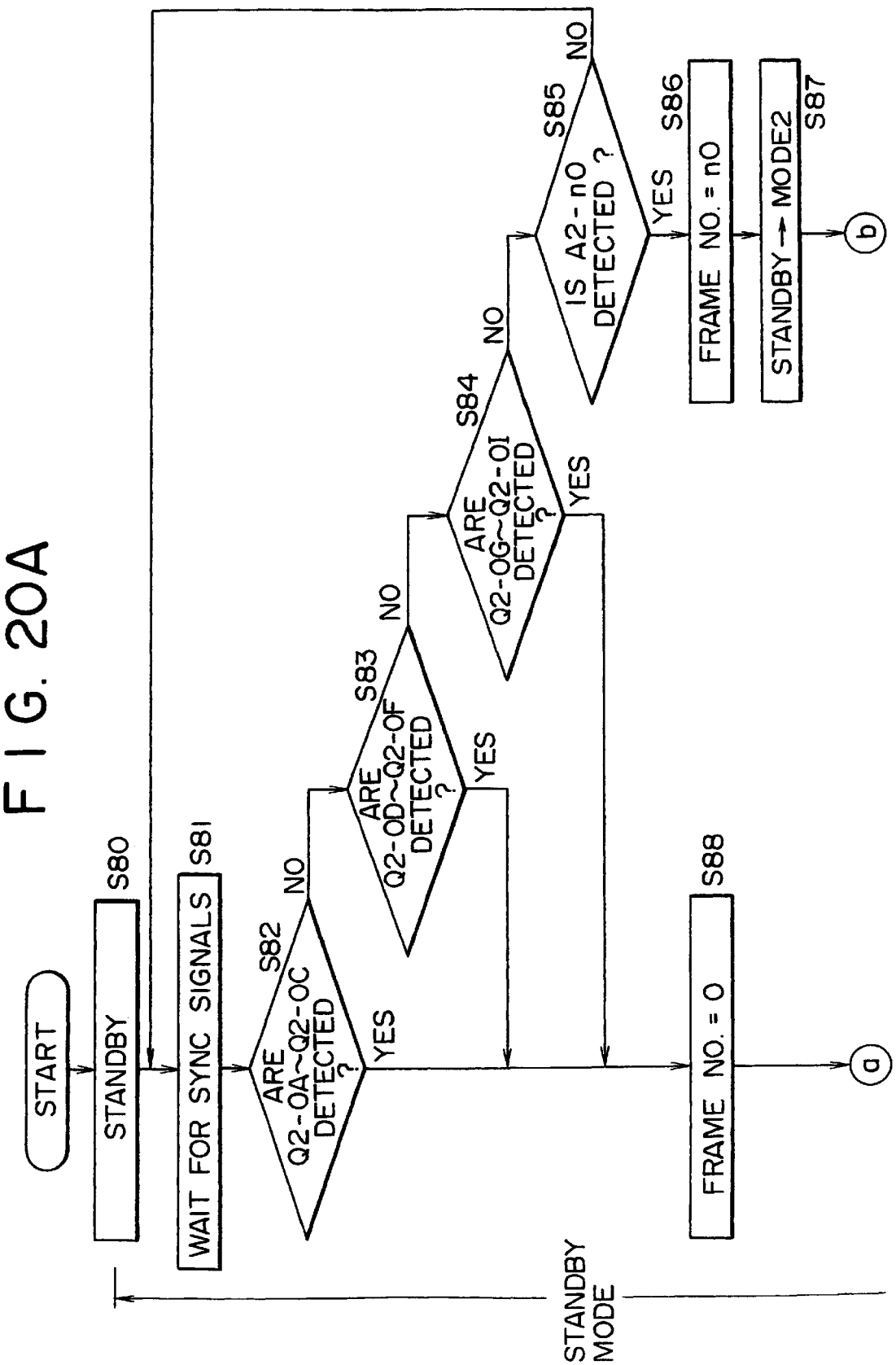

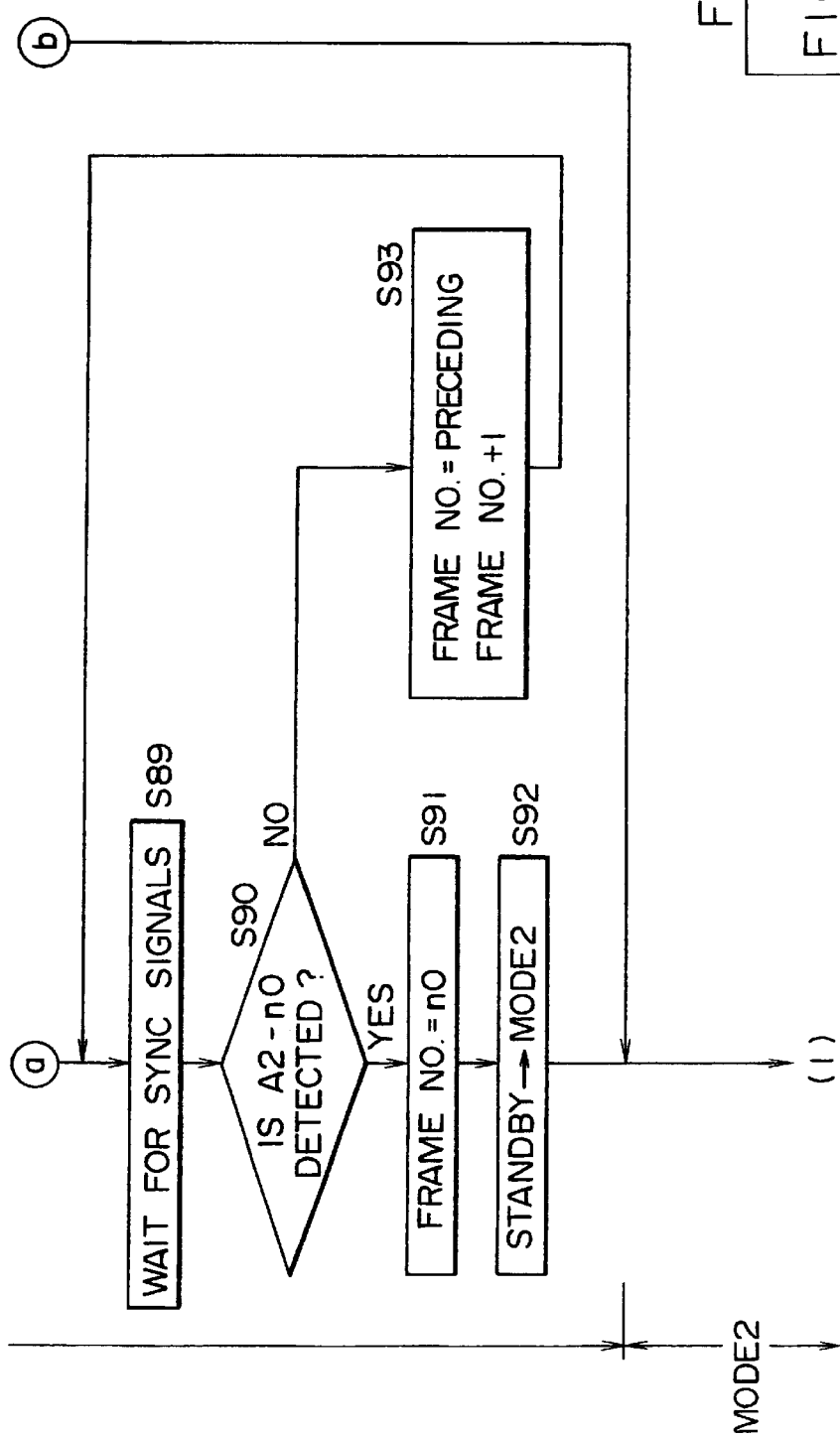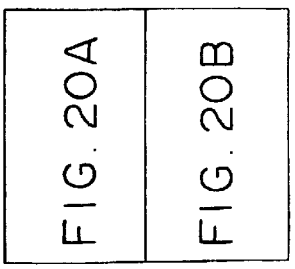

ERROR-CORRECTING STORAGE MEDIUM REPRODUCTION APPARATUS AND METHOD USING FRAMES AND SYNCHRONIZATION PATTERNS

BACKGROUND OF THE INVENTION

The present invention relates to a storage medium reproduction apparatus and a storage medium reproduction method. More particularly, the invention relates to an apparatus and a method for reproducing from a storage medium data which are divided into frames of a predetermined length, with synchronizing patterns inserted between the frames.

Conventional storage medium reproduction systems correct errors in reproduced data in units of data of a predetermined length, i.e., in increments of blocks. It is necessary for these systems to store one-block data into memory before proceeding with error correction.

In extracting each block from the data retrieved from the storage medium, the conventional systems need to determine precisely each block of data using two markers: synchronizing patterns included at predetermined intervals in the data, and an ID code (address code) inserted immediately after each specific synchronizing pattern. The extracted blocks of data are stored into suitable areas in memory.

Operating as they do, the conventional storage medium reproduction systems fail to detect synchronizing patterns if the storage medium has a physical blemish or if the medium has dust stuck on its surface. In such cases, it is difficult for the systems accurately to extract each block of data for storage into predetermined areas in memory.

With blocks of data not placed accurately in memory, error correction is not properly carried out. This in turn makes it impossible to reproduce stored data precisely from the storage medium.

Furthermore, in the case of DVDs (digital versatile disks), only 16 ID codes are included per block (i.e., only one ID code for 26 frames that make up one block). Addresses can only be detected from this portion. Thus if any one of such a limited number of ID codes is not accurately reproduced, the data retrieved from the storage medium cannot be placed unfailingly into a suitable location in memory.

OBJECT AND SUMMARY OF THE INVENTION

It is therefore an object of the present invention to provide an apparatus and a method for accurately extracting each block of data from the data retrieved from a physically blemished or dirt-smeared storage medium so as to store the extracted blocks of data precisely into predetermined areas in memory, whereby error correction is carried out unfailingly.

In carrying out the invention and according to a first aspect thereof, there is provided a storage medium reproduction apparatus comprising: synchronizing pattern detection means for detecting synchronizing patterns; and frame determination means for determining a currently reproduced frame on the basis of regularity of the synchronizing patterns detected by the synchronizing pattern detection means.

According to a second aspect thereof, there is provided a storage medium reproduction method comprising the steps of: detecting synchronizing patterns; and determining a currently reproduced frame on the basis of regularity of the synchronizing patterns detected by the step of synchronizing pattern detection.

According to a third aspect thereof, there is provided a storage medium reproduction apparatus comprising: synchronizing pattern detection means for detecting synchronizing patterns; preamble part detection means for detecting a preamble part on the basis of regularity of the synchronizing patterns detected by the synchronizing pattern detection means; and frame determination means for determining a currently reproduced frame on the basis of regularity of the synchronizing patterns detected by the synchronizing pattern detection means.

According to a fourth aspect of the invention, there is provided a storage medium reproduction method comprising the steps of: detecting synchronizing patterns; detecting a preamble part on the basis of regularity of the synchronizing patterns detected by the step of synchronizing pattern detection; and determining a currently reproduced frame on the basis of regularity of the synchronizing patterns detected by the step of synchronizing pattern detection.

In the storage medium reproduction apparatus according to the first aspect of the invention, the synchronizing pattern detection means detects synchronizing patterns, and the frame determination means determines a currently reproduced frame on the basis of regularity of the synchronizing patterns detected by the synchronizing pattern detection means. Illustratively, the synchronizing pattern detection means detects synchronizing patterns retrieved from the storage medium. Based on the regularity of a plurality of synchronizing patterns thus detected, the frame determination means determines frames one by one and places them consecutively into suitable areas in memory.

With the storage medium reproduction method according to the second aspect of the invention, the step of synchronizing pattern detection detects synchronizing patterns, and the step of frame determination determines a currently reproduced frame on the basis of regularity of the synchronizing patterns detected by the synchronizing pattern detection step. Specifically, the synchronizing pattern detection step detects synchronizing patterns retrieved from the storage medium. In accordance with the regularity of a plurality of synchronizing patterns thus detected, the frame determination step determines frames one by one and places them consecutively into suitable areas in memory.

In the storage medium reproduction apparatus according to the third aspect of the invention, the synchronizing pattern detection means detects synchronizing patterns; the preamble part detection means detects a preamble part on the basis of regularity of the synchronizing patterns detected by the synchronizing pattern detection means; and the frame determination means determines a currently reproduced frame on the basis of regularity of the synchronizing patterns detected by the synchronizing pattern detection means. Illustratively, the synchronizing pattern detection means detects synchronizing patterns retrieved from the storage medium. The preamble part detection means then detects a preamble part based on the regularity of two synchronizing patterns detected. The frame determination means determines frames one by one in keeping with the regularity of a plurality of synchronizing patterns and places the frames consecutively into suitable areas in memory.

With the storage medium reproduction method according to the fourth aspect of the invention, the step of synchronizing pattern detection detects synchronizing patterns; the step of preamble part detection detects a preamble part on the basis of regularity of the synchronizing patterns detected by the synchronizing pattern detection step; and the step of frame determination determines a currently reproduced frame on the basis of regularity of the synchronizing patterns detected by the synchronizing pattern detection step. Specifically, the synchronizing pattern detection step detects synchronizing patterns retrieved from the storage medium. In accordance with the regularity of two synchronizing patterns detected, the preamble part detection step detects a preamble part. Based on the detected preamble part, the frame determination step determines frames one by one and places them consecutively into suitable areas in memory.

These and other objects, features and advantages of the invention will become more apparent upon a reading of the following description and appended drawings.

BRIEF DESCRIPTION OF THE DRAWINGS

FIG. 3 is a view of a typical format of a sector;

FIG. 4 is a view of typical synchronizing patterns;

FIGS. 5A and 5B are views showing how frame numbers are arranged in a sector;

FIG. 6 is a view of a detailed constitution of a demodulator 12 in FIG. 1;

FIG. 7 is a view of a detailed constitution of shift registers in FIG. 6;

FIG. 8 is a view of a detailed constitution of a synchronizing signal determination circuit 34 in FIG. 6;

FIGS. 14A and 14B are flowcharts of steps constituting a typical process performed by a sequencer 35 in FIG. 6;

FIG. 15 is a view of one block of data comprising synchronizing patterns that cannot be reproduced from a smeared or otherwise blemished surface of an optical disk 10;

FIGS. 17A and 17B are flowcharts of steps constituting a typical process performed by the sequencer 35 in FIG. 6;

FIGS. 20A and 20B are flowcharts of steps constituting a typical process performed by the sequencer 35 in FIG. 6.

DESCRIPTION OF THE PREFERRED EMBODIMENTS

Figure 1:
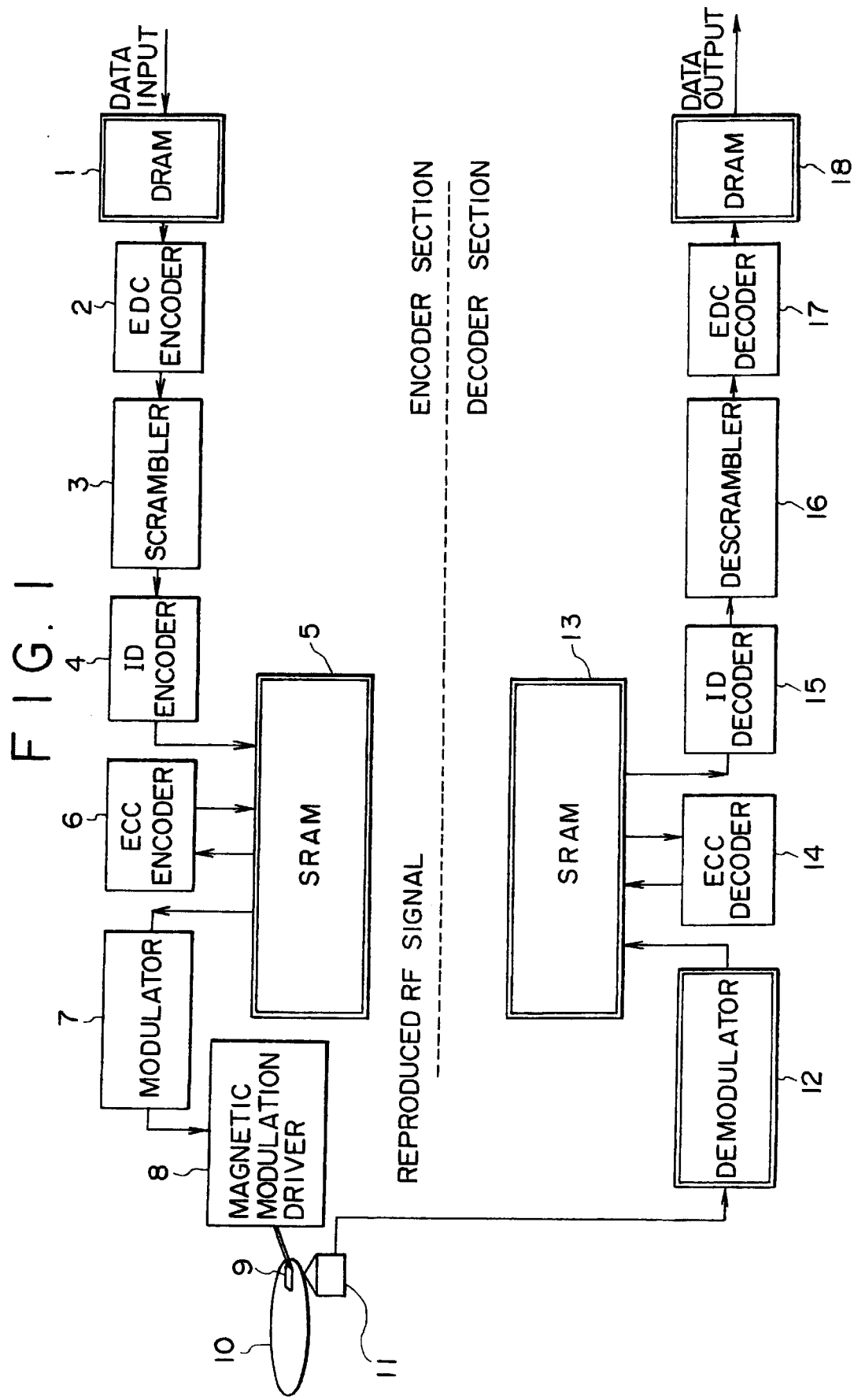
FIG. 1 is a block diagram of an optical disk recording and reproducing apparatus embodying the invention.

FIG. 1 is a block diagram of an optical disk recording and reproducing apparatus embodying the invention. In FIG. 1, a DRAM (dynamic random access memory) 1 temporarily accommodates input data. An EDC (error detection code) encoder 2 adds an EDC for error detection to the data supplied from the DRAM 1 and outputs the EDC-supplemented data. A scrambler 3 scrambles the data from the EDC encoder 2. An ID encoder 4 adds an ID code to the scrambled data.

The data output from the ID encoder 4 is placed into an SRAM (static random access memory; storage means) 5. When one block of data has been stored in the SRAM 5, an ECC (error correction code) encoder 6 adds an ECC for error correction to that block of data. A modulator 7 reads data successively from the SRAM 5, modulates the retrieved data, and sends the modulated data to a magnetic modulation driver 8.

In accordance with the data from the modulator 7, the magnetic modulation driver 8 drives a magnetic coil 9 to apply a magnetic field to a region in which to record data on an optical disk 10. An optical pickup 11 irradiates a recording or reproducing laser beam to the optical disk 10. When receiving a reflected reproducing laser beam from the optical disk 10, the optical pickup 11 turns the reflected beam into an electrical signal through photo-electric conversion. The resulting electrical signal is output as a reproduced RF signal.

A demodulator 12 (synchronizing pattern detection means; synchronizing pattern detection step) demodulates the reproduced RF signal from the optical pickup 11. The demodulated data is placed into a suitable area in the SRAM 13. When one block of data from the demodulator 12 has been placed in the SRAM 13, an ECC decoder 14 performs error correction on the data.

An ID decoder 15 reads data from the SRAM 15 to extract ID codes therefrom. A descrambler 16 descrambles data coming from the ID decoder 15. An EDC decoder 17 extracts an EDC from the data sent from the descrambler 16 and checks to see if any error is included in the reproduced data. A DRAM 18 temporarily accommodates the data from the EDC decoder 17 and subsequently outputs the data.

How the embodiment outlined above works will now be described. Initially input data is accommodated temporarily in the DRAM 1 before being forwarded to the EDC encoder 2. The EDC encoder 2 adds an EDC for error detection to the data from the DRAM 1, and sends the EDC-supplemented data to the scrambler 3. The scrambler 3 scrambles the received data (i.e., changes the sequence of data) for protection against the failure of data reproduction due to a scratch or blemish on the optical disk 10 on which data read errors may be concentrated in a specific sector or frame and output it to the ID encoder 4.

The ID encoder 4 inserts into the head of each sector an ID code by which to detect an address on the optical disk 10, and places the ID code-headed sectors into the SRAM 5 consecutively. When one block of data has been placed in the SRAM 5, the ECC encoder 6 adds an ECC to that block of data.

Figure 2:
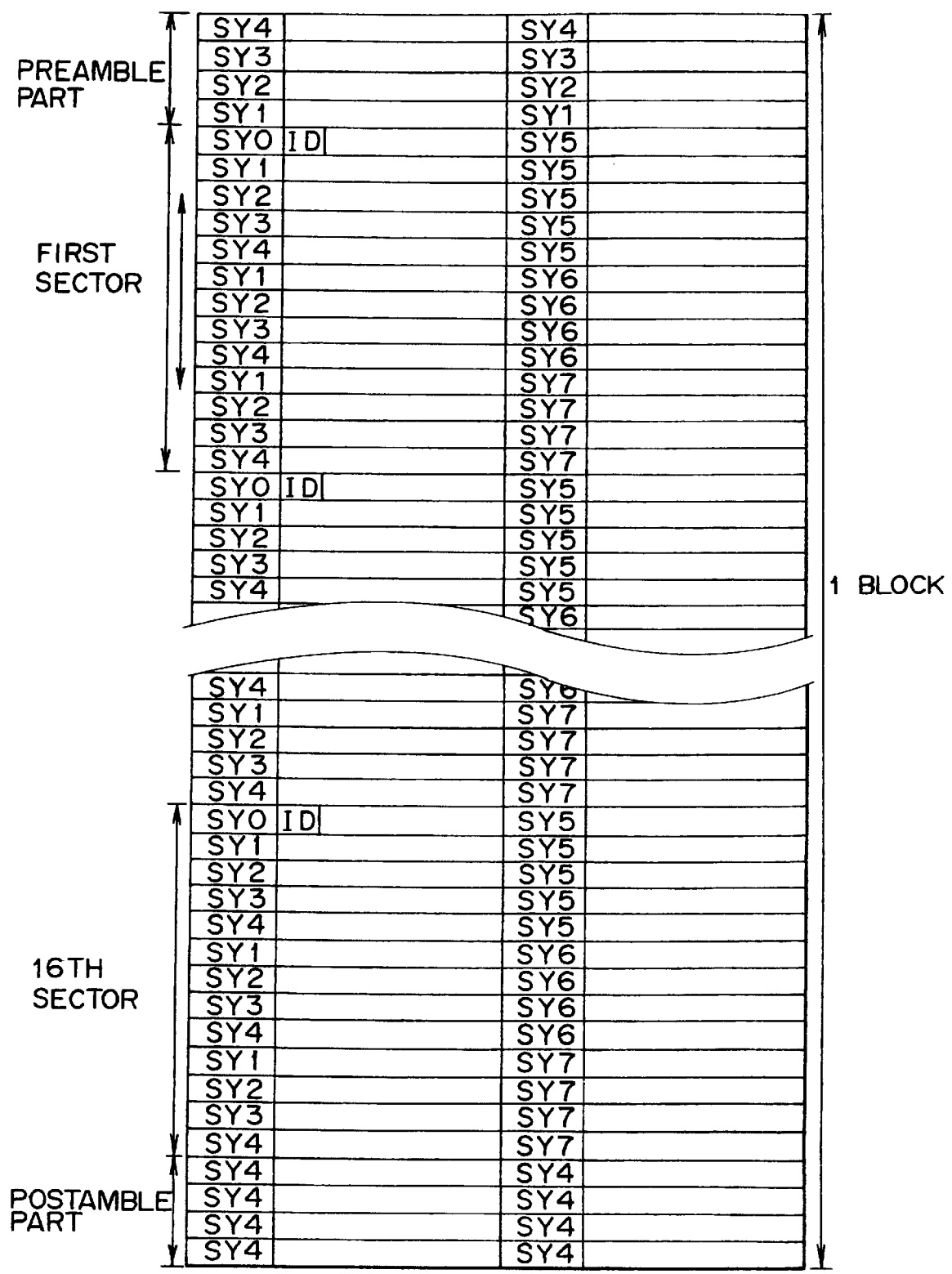
FIG. 2 is a view of a typical format of one-block data.

FIG. 2 is a view of a typical format of one-block data. As shown in FIG. 2, one block of data comprises a preamble part made of first four rows, a first through a sixteenth sector each made up of 13 rows, and a postamble part composed of last four rows. Each row is constituted by two frames, and each frame is headed by a synchronizing pattern (SY0 through SY7) that provides synchronism. Immediately after the synchronizing pattern SY0 heading each of the first through the sixteenth sectors is an ID code that determines an address.

FIG. 3 is a view of a typical format of a sector. As illustrated, each sector is headed by the synchronizing pattern SY0. Immediately after the pattern SY0 is an ID code. The second and subsequent rows (i.e., rows 2–13) have their first frames (i.e., odd-numbered frames) headed by synchronizing patterns SY1 through SY4 respectively. The first through the fifth rows have their second frames (i.e., even-numbered frames) retaining a synchronizing pattern SY5 each; the sixth through the ninth rows have their second frames holding a synchronizing pattern SY6 each; the tenth through the thirteenth rows have their second frames containing a synchronizing pattern SY7 each.

FIG. 4 is a view of typical synchronizing patterns SY0 through SY7. Each of the synchronizing patterns SY0 through SY7 has four states: state 1 through state 4. The four-state scheme is intended to convert the synchronizing patterns SY0 through SY7, when subjected to 8–16 conversion, to four different kinds of data.

Returning to FIG. 1, the data supplemented with ECCs by the ECC encoder 6 is read successively from the SRAM 5 and sent to the modulator 7. The modulator 7 modulates the received data and forwards the modulated data to the magnetic modulation driver 8. In accordance with the data from the modulator 8, the magnetic modulation driver 8 drives the magnetic coil 9 to apply a magnetic field to a suitable area on the optical disk 10.

In the state above, the optical pickup 11 emits a recording laser beam to the disk surface. On the optical disk 10, the beam-irradiated spot has its storage medium temperature raised to a level exceeding the Curie point. The spot thus heated on the storage medium is magnetized in the direction of the magnetic field applied by the magnetic coil 9, thereby preserving data.

Below is a description of how to reproduce data thus recorded on the optical disk 10. The optical pickup 11 irradiates a reproducing laser beam to a suitable area on the optical disk 10. The reproducing laser beam is lower in intensity than the recording laser beam. The reflected beam from the disk surface is subjected to photoelectric conversion by the optical pickup 11 that generates a reproduced RF signal. The demodulator 12 demodulates the reproduced RF signal and places the demodulated data one block at a time into the SRAM 13. During block-by-block data movement from the demodulator 12 to the SRAM 13, it is necessary to extract correctly each block of data from the reproduced RF signal and to place the data block by block exactly into appropriate areas in the SRAM 13. The processes involved will be described later.

Each block of data placed in the SRAM 13 is subjected to error correction by the ECC decoder 14. The error-corrected data is retrieved successively by the ID decoder 15 which extracts an ID code from the data. The descrambler 16 descrambles the data from the ID decoder 15 by referencing the extracted ID code. The descrambled data is output to the EDC decoder 17. The EDC decoder 17 detects an EDC from the descrambled data and checks to see if the reproduced data contains any error. If no error is detected, the EDC decoder 17 outputs the data to the DRAM 18. If an error is detected, the EDC decoder 17 illustratively causes the optical pickup 11 to read the same data again from the optical disk 10.

The DRAM 18 temporarily accommodates data sent from the EDC decoder 17. Later, the DRAM 18 outputs the data in synchronism with the data read speed of an external device (not shown) which uses the data.

A detailed constitution of the demodulator 12 in FIG. 1 and its workings will now be described. As described, this embodiment performs error correction on a block by block basis. This means that the data demodulated by the demodulator 12 is placed temporarily into the SRAM 13 one block at a time. Thereafter, it is necessary to extract precisely one block of data from the reproduced RF signal and to place the extracted data accurately into an appropriate area in the SRAM 13. With this embodiment, a frame determination circuit (to be discussed below) will detect a frame number (also to be described) of the currently reproduced frame, extract one block of data correctly from the reproduced RF signal from the detected frame number, and set the extracted data to a suitable region in the SRAM 13.

FIGS. 5A and 5B are views of a frame number layout in a sector. FIG. 5A shows how a sector is structured, and FIG. 5B indicates frame numbers assigned to the respective frames in the sector of FIG. 5A. Specifically, 26 frames of each sector are assigned frame numbers 0 through 25.

FIG. 6 is a block diagram of a frame determination circuit 40 included in the demodulator 12 of FIG. 1. In FIG. 6, shift registers 30 through 33 are a four-bit shift register each. The registers 30 through 33 each receive a three-bit synchronizing signal and a one-bit detection signal from a detection block (not shown) incorporated in the demodulator 12, and shift the signals in synchronism with a flywheel-type synchronizing signal (to be described later).

Input data (i.e., output data from the detection block, not shown) to the shift register 30 and output data from the shift registers 30 through 33 are input as signals SYD0 through SYD4 to a synchronizing signal determination circuit 34 (frame determination means; frame determination step). Given the signals SYD0 through SYD4, the synchronizing signal determination circuit 34 causes a sequencer 35 to determine and output the frame number of the currently reproduced frame.

FIG. 7 is a view showing a detailed constitution of the shift registers 30 through 33 in FIG. 6. Of the signals sent from the synchronizing signal detection block, not shown, the three-bit synchronizing signal is a signal that indicates the reproduced synchronizing pattern, i.e., one of the patterns SY0 through SY7. The synchronizing patterns and the synchronizing signal bits have the following relations therebetween:

SY0→"000"
SY1→"001"
SY7→"111"

The detection signal is output from the synchronizing signal detection block, not shown. If the synchronizing pattern extracted from the reproduced RF signal matches any one of the synchronizing patterns in FIG. 4, the detection signal is "1"; if the extracted synchronizing pattern fails to match any synchronizing patterns, the detection signal is "0."

The three-bit synchronizing signal is input to shift registers 30-1 through 30-3 whereas the detection signal is input to a shift register 30-4. The input data is shifted right from one register to another in synchronism with the flywheel-type synchronizing signal. Because the input and output signals to and from the shift registers 30 through 33 are input to the synchronizing signal determination circuit 34, the signals fed to the circuit 34 are delayed by an integer multiple of the period of the synchronizing signal in effect. That is, the signals SYD0 through SYD4 are delayed by 0 to 4 periods of the synchronizing signal before they are supplied to the synchronizing signal determination circuit 34.

The provision of "flywheel" signifies that where a synchronizing pattern cannot be reproduced from a smeared or otherwise blemished disk surface, a substitute synchronizing pattern is generated by referring to the output of a counter, not shown, and is inserted to a suitable location of data. Such processing is generally practiced by systems handling CDs (compact disks) and MDs (mini disks).

FIG. 8 is a view of a detailed constitution of the synchronizing signal determination circuit 34 in FIG. 6. In FIG. 8, synchronizing signal coincidence detection circuits 50 through 54 determine which of the synchronizing patterns SY0 though SY7 are matched with the signals SYD0 through SYD4 output from the shift registers 30 through 33. Illustratively, the synchronizing signal coincidence detection circuit 50 receives the undelayed signal SYD0 and, if the input synchronizing signal is found to match SY0, brings a signal SYD0DET0 alone to a "1" state.

The signals SYD0 through SYD4 are each composed of four bits and will be indicated below as SYD0[3 . . . 0] through SYD4[3 . . . 0]. In the signal SYDxDETy output by each of the synchronizing signal coincidence detection circuits 50 through 54, x stands for a delay period count and y for the corresponding synchronizing pattern (one of SY0 through SY7). For example, if the synchronizing signal coincidence detection circuit 54 outputs a signal SYD4DET7 that is set to "1", it signifies the detection of the signal SY7 that is delayed by four periods.

A consecutive coincidence detection circuit 55 (frame detection means) detects the frame number of the currently reproduced frame on the basis of the signals coming from the synchronizing signal coincidence detection circuits 50 through 54. The detected frame number is output by means of signals A2-y through A4-y and a signal B4-y. In the format Ax-y, x stands for the number of synchronizing signals consecutively matched and y denotes a frame number.

Figure 9:
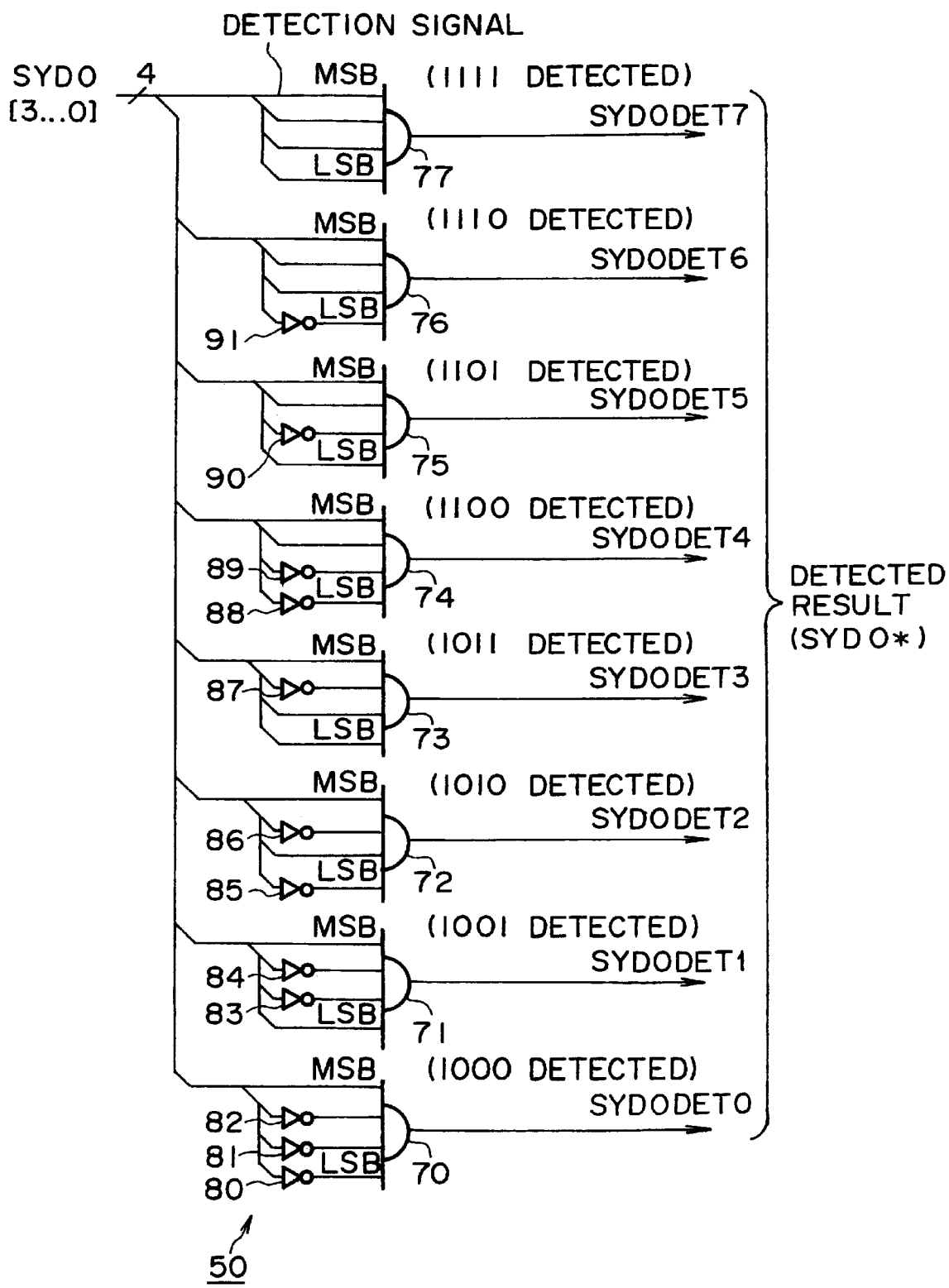
FIG. 9 is a view of a detailed constitution of a synchronizing signal coincidence detection circuit 50 in FIG. 8.

FIG. 9 is a block diagram showing a detailed constitution of the synchronizing signal coincidence detection circuit 50 in FIG. 8. As shown in FIG. 9, the synchronizing signal coincidence detection circuit 50 comprises AND circuits 70 through 77 as well as inverters 80 through 91. The AND circuits 70 through 77 have all their outputs set to "0" if the synchronizing signal detection block, not shown, outputs a signal SYD0[3 . . . 0] with its MSB (most significant bit) set to "0" as the detection signal (i.e., if the synchronizing signal is not correctly detected). If the detection signal is found to be set to "1," one of the AND circuits 70 through 77 outputs "1." Illustratively, if the detection signal is "1" and if the synchronizing signal is "111," then the AND circuit 77 alone outputs "1." In other words, the synchronizing signal coincidence detection circuit 50 acts as a decoder that converts four-bit data to eight-bit data.

Figure 10:
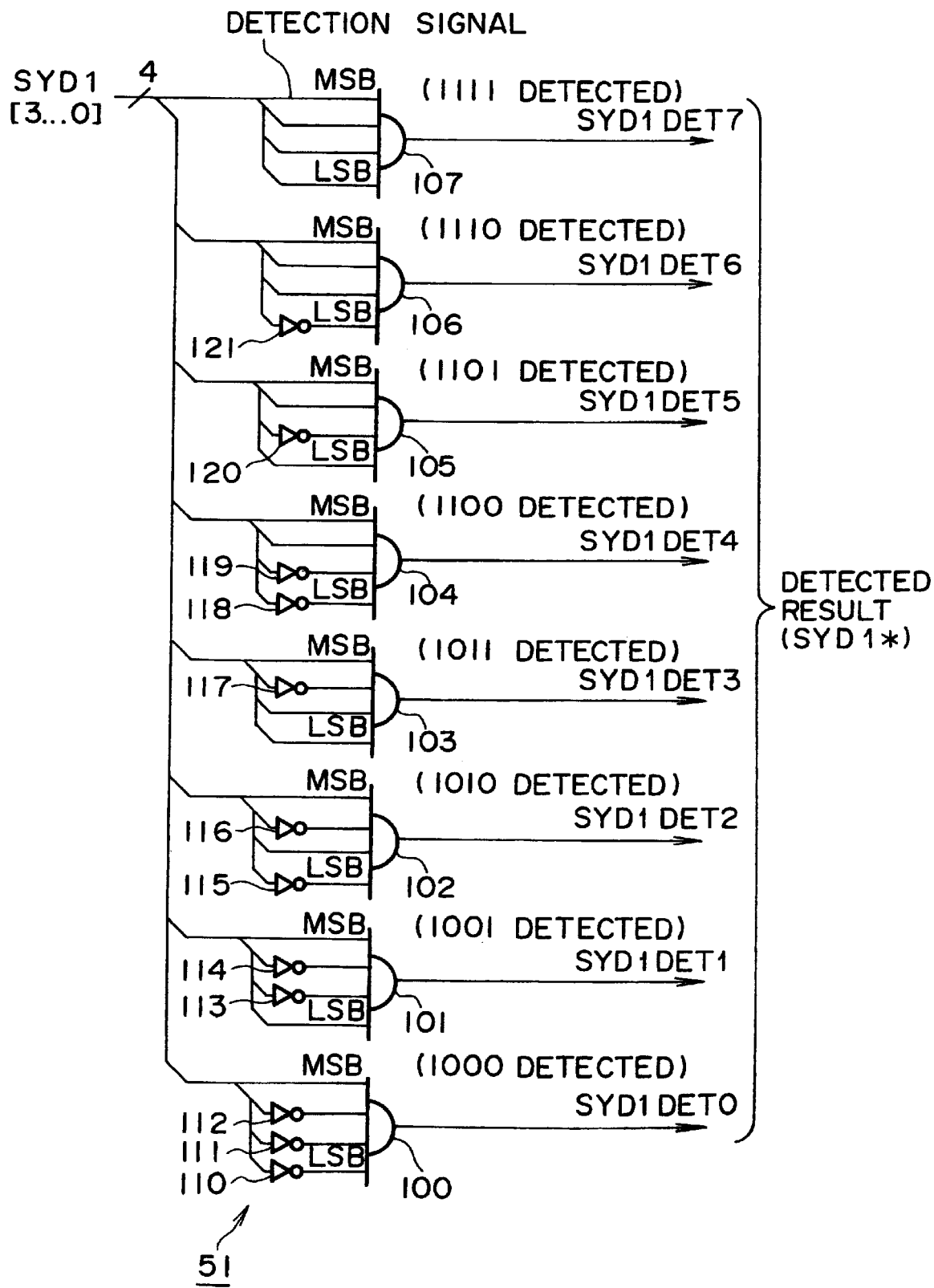
FIG. 10 is a view of a detailed constitution of a synchronizing signal coincidence detection circuit 51 in FIG. 8.

FIG. 10 is a view of a detailed constitution of a synchronizing signal coincidence detection circuit 51, not shown. The synchronizing signal coincidence detection circuit 51 is the same in structure as the synchronizing signal coincidence detection circuit 50. That is, the circuit 51 includes AND circuits 100 through 107 and inverters 110 through 121. Given the input signal SYD1[3 . . . 0], the synchronizing signal coincidence detection circuit 51 generates signals SYD1DET0 through SYD1DET7. Synchronizing signal coincidence detection circuits 52 through 54 are also of the same constitution and thus will not be described further.

In the above setup, five signals each made up of four bits (SYD0[3 . . . 0] through SYD4[3 . . . 0]) are turned into five signals each comprising eight individual signals (i.e., a total of 40 signals). The process takes place as follows:

SYD0[3 . . . 0]→SYD0DET0 through SYD0DET7
SYD1[3 . . . 0]→SYD1DET0 through SYD1DET7
SYD7[3 . . . 0]→SYD7DET0 through SYD7DET7

Referencing these 40 signals, the consecutive coincidence detection circuit 55 checks to see if the synchronizing signals match consecutively. Upon checkup, the circuit 55 generates and outputs signals A2-y, A3-y, A4-y and B4-y (to be described later).

Figure 11:
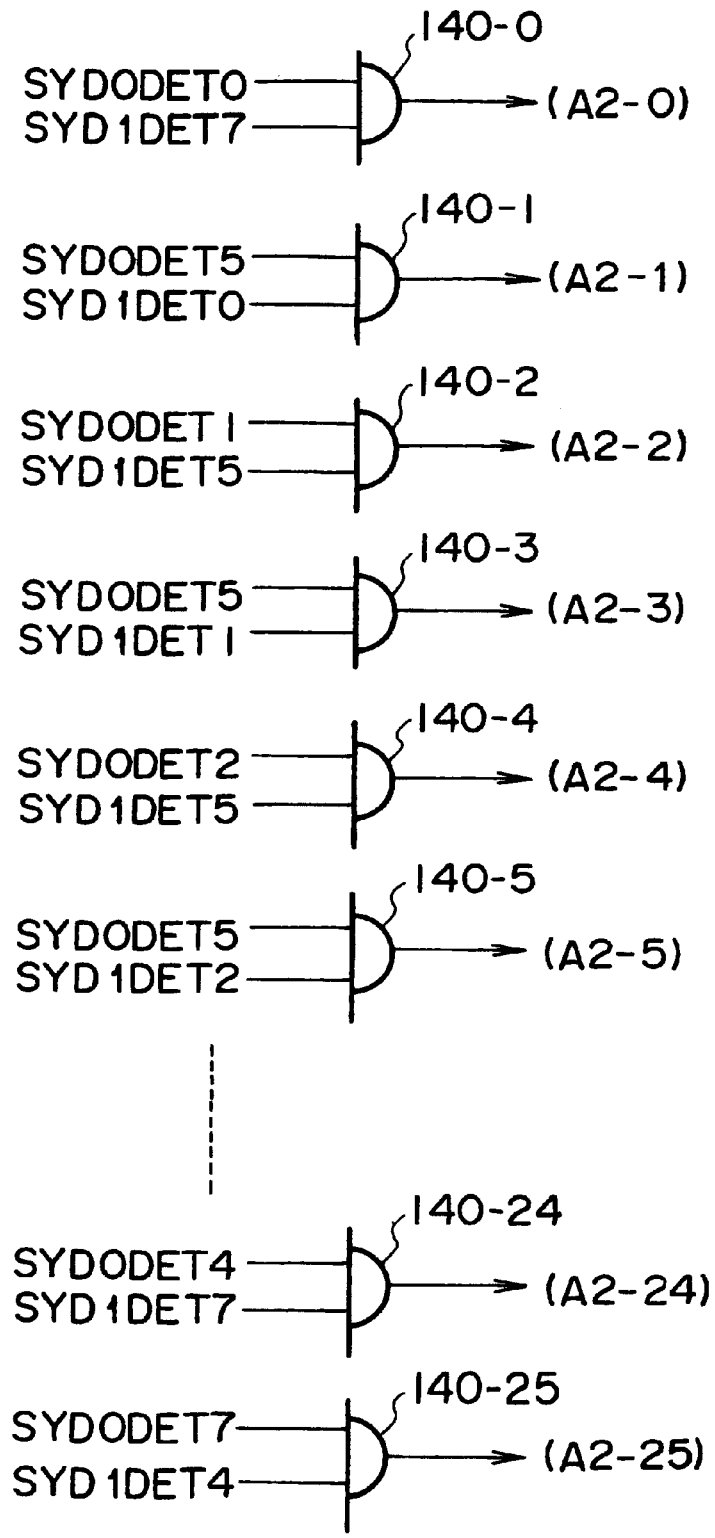
FIG. 11 is a view of one partial constitution of a consecutive coincidence detection circuit 55 in FIG. 8.

FIG. 11 is a view of that part of the consecutive coincidence detection circuit 55 which constitutes a circuit for detecting two consecutive synchronizing signals being matched. As shown in FIG. 11, the circuit that detects two consecutive synchronizing signals being matched is composed of AND circuits 140-0 through 140-25. Each AND circuit receives a combination of two signals, one signal being selected from the signals output by the synchronizing signal coincidence detection circuit 50, the other signal being one of the signals output by the synchronizing signal coincidence detection circuit 51.

The signal combinations are based on the layout of the synchronizing patterns SY0 through SY7 in each sector. Specifically, the AND circuit 140-0 receives the signal SYD0DET0 from the synchronizing signal coincidence detection circuit 50 and the signal SYD1DET7 from the synchronizing signal coincidence detection circuit 51. Thus the AND circuit 140-0 has its output signal A2-0 set to "1" if the synchronizing pattern of the currently reproduced frame is SY0 and if the immediately preceding synchronizing pattern is SY7 (i.e., when the synchronizing patterns are read from the frames having a frame number 0 in the second through the sixteenth sectors). The signal A2-0 signifies that the currently reproduced signal has frames with the frame number 0.

In the first sector, the frame immediately before the frame with the frame number 0 (i.e., the last frame of the preamble part in this case) does not contain the synchronizing pattern SY7. For that reason, the AND circuit 140-0 does not output "1" when the frame having the frame number 0 is reached.

Likewise, the AND circuit 140-1 has its output signal A2-1 set to "1" when the frame having a frame number 1 is currently reproduced, i.e., when the synchronizing pattern SY5 is currently reproduced following the preceding pattern SY0. The AND circuits 140-2 through 140-25 also act likewise. That is, any one of these circuits has its output set to "1" if two consecutive synchronizing patterns are detected within a sector. By detecting the status of the signals A2-0 through A2-25, it is possible to know from which frame the data is currently reproduced. For example, if the signal A2-25 is found to be set to "1," it signifies that the data is currently reproduced from the frame with a frame number 25.

Figure 12:
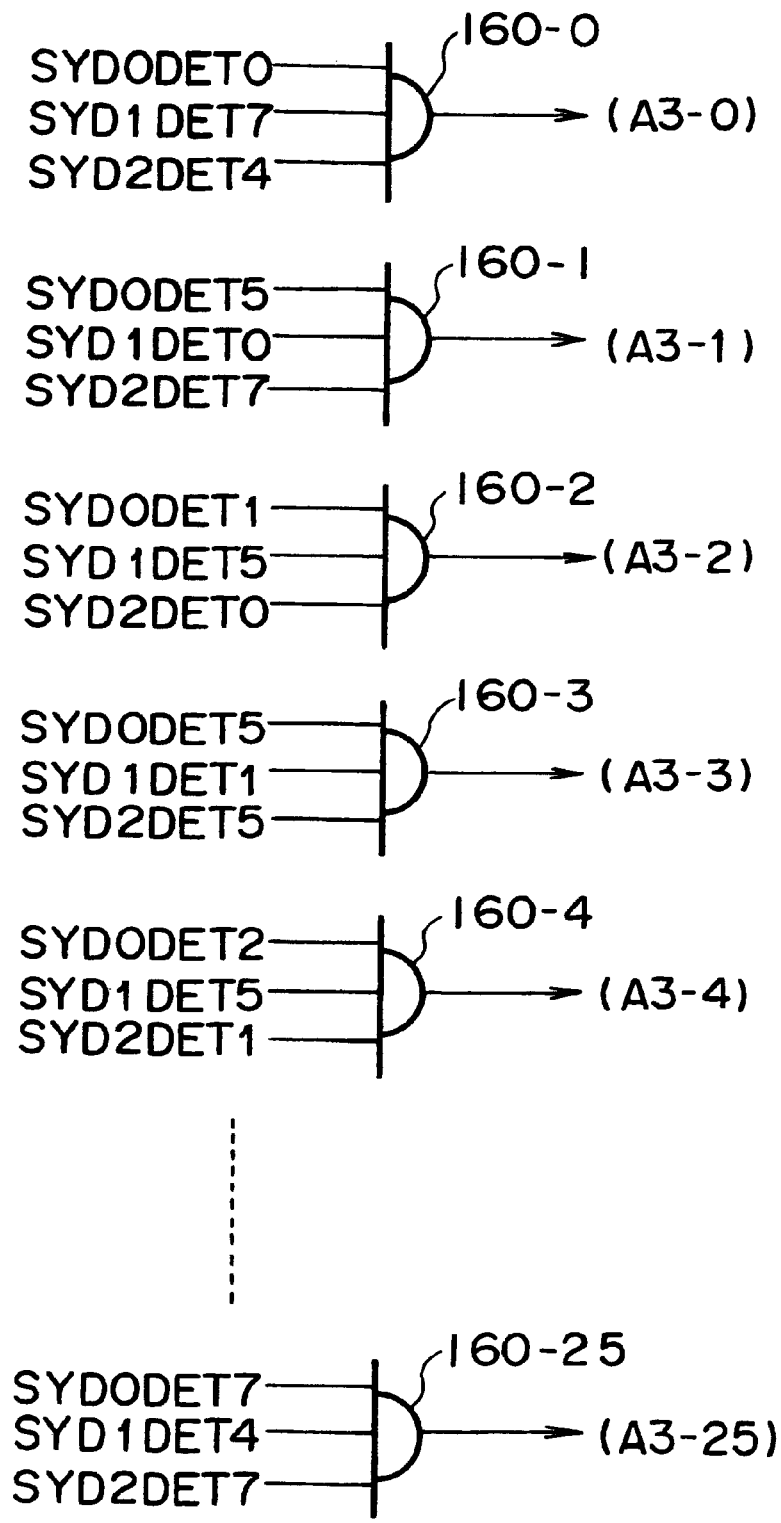
FIG. 12 is a view of another partial constitution of the consecutive coincidence detection circuit 55 in FIG. 8.

FIG. 12 is a view of that part of the consecutive coincidence detection circuit 55 which constitutes a circuit for detecting three consecutive synchronizing signals being matched. The circuit that detects three consecutive synchronizing signals being matched is composed of AND circuits 160-0 through 160-25 having three input terminals each. The AND circuits 160-0 through 160-25 each select and receive one of the signals output from each of the synchronizing signal coincidence detection circuits 50 through 52 in FIG. 8.

In the setup of FIG. 12, as with the arrangement in FIG. 11, input signals are combined on the basis of the layout of the synchronizing patterns in each sector. Illustratively, the AND circuit 160-0 receives signals SYD0DET0, SYD1DET7 and SYD2DET4 from the synchronizing signal coincidence detection circuits 50 through 52 respectively. In that case, all signals are set to "1" if the synchronizing pattern SY0 is currently reproduced from a frame with the frame number 0 within a given sector, the synchronizing pattern SY0 preceding the patterns SY7 and SY4 retrieved in that order from frames having frame numbers 24 and 25 within the immediately preceding sector. Thus the AND circuit 160-0 has its output signal A3-0 also set to "1." As another example, the AND circuit 160-25 outputs "1" if the synchronizing patterns SY7, SY4 and SY7 are all detected correctly from frames having frame numbers 23, 24 and 25 respectively.

Figure 13:
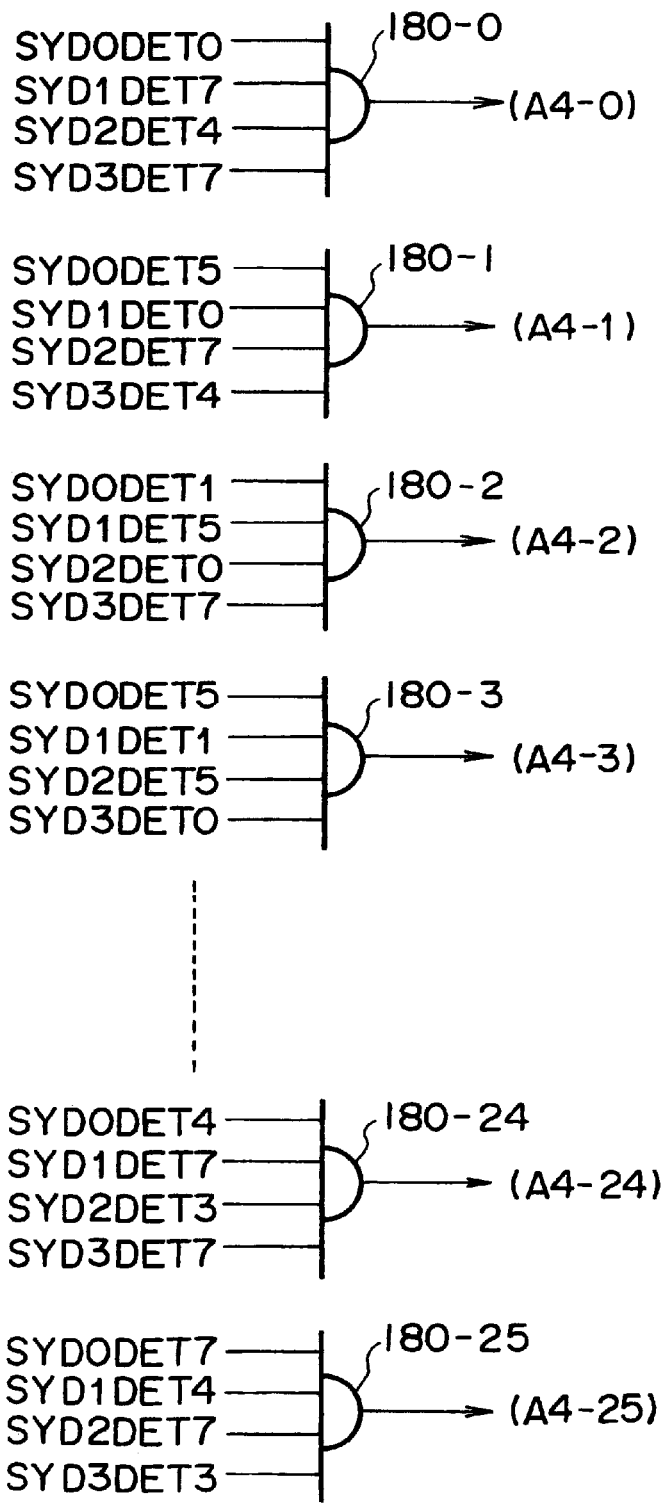
FIG. 13 is a view of yet another partial constitution of the consecutive coincidence detection circuit 55 in FIG. 8.

FIG. 13 is a view of that part of the consecutive coincidence detection circuit 55 which constitutes a circuit for detecting four consecutive synchronizing signals being matched. The circuit that detects four consecutive synchronizing signals being matched is composed of AND circuits 180-0 through 180-25 having four input terminals each. The AND circuits 180-0 through 180-25 each select and receive one of the signals output from each of the synchronizing signal coincidence detection circuits 50 through 53 in FIG. 8.

The signals input to the AND circuits 180-0 through 180-25 are combined in the same manner as with the above setups. That is, the signal combinations are based on the synchronizing patterns of four consecutive frames within each sector.

The signals A2-y through A4-y and B4-y (to be described later) from the consecutive coincidence detection circuit 55 of FIG. 8 which was shown having the components described above are supplied to the sequencer 35 in the synchronizing signal determination circuit 34 in FIG. 6. The signals are processed by the sequencer 35 in the manner to be described below, whereby the frame number of the currently reproduced frame is detected.

FIG. 14 is a flowchart of steps constituting a typical process performed by the sequencer 35. The process is carried out upon data reproduction from the optical disk 10.

In step S1 of FIG. 14, the sequencer 35 enters standby (STBY) mode. Specifically, the signals A2-y through A4-y from the circuits in FIGS. 11 through 13 are all enabled and accepted. In step S2, the sequencer 35 waits for the synchronizing signals to be read out. With the synchronizing signals retrieved, step S3 is reached. In step S3, a check is made to see if any one of the signals A2-y (y=0, 1, . . . , 25) is set to "1" indicating that two consecutive synchronizing signals are matched. If any one of the signals A2-y is found to be "1" ("YES" in step S3), the value y of the detected signal is set to a variable n0, and step S4 is reached. If none of the signals is found to be "1" ("NO" in step S3), then step S2 is reached again from which the steps are repeated.

In step S4, the frame number is set to n0. The demodulator 12 in FIG. 1 references that frame number, places the reproduced data accordingly to an appropriate area in the SRAM 13, and goes to step S5. In step S5, the sequencer 35 switches from standby mode to mode 2. Specifically, the signals A2-y through A4-y are all enabled and accepted. With mode 2 entered, step S6 is reached.

In step S6, the sequencer 35 waits for the synchronizing signals to be read out. With the synchronizing signals retrieved, step S7 is reached. In step S7, a check is made to see if any one of the signals A3-y (y=0, 1, . . . , 25) is set to "1" indicating that three consecutive synchronizing signals are matched. If none of the signals A3-y is found to be "1" ("NO" in step S7), then step S11 is reached.

In step S11, a check is made to see if any one of the signals A2-y (y=0, 1, . . . , 25) is set to "1." If any one of the signals A2-y is found to be "1" ("YES" in step S11), then the value y is inserted into a variable n2 before step S12 is reached. In step S12, the frame number is set to n2. Step S12 is followed by step S6 from which the steps are repeated. If none of the signals A2-y is found to be "1" ("NO" in step S11), then step S13 is reached in which the frame number is incremented by 1. Step S13 is followed by step S6 from which the steps are repeated.

If any one of the signals A3-y is found to be "1" in step S7 ("YES"), then the value y is inserted into a variable n1 and step S8 is reached. In step S8, the frame number is set to n1. The demodulator 12 references the frame number n1, places the reproduced data accordingly to a suitable area in the SR 13, and goes to step S9. In step S9, the sequencer switches from mode 2 to mode 3. As a result, only the signals A3-y and A4-y are enabled and the signals A2-y are ignored. Step S9 is followed by step S14.

In step S14, the sequencer 35 waits for the synchronizing signals to be read out. With the synchronizing signals retrieved, step S15 is reached. In step S15, a check is made to see if any one of the signals A4-y is set to "1." If none of the signals A4-y is found to be "1" ("NO" in step S15), step S18 is reached. In step S18, a check is made to see if any one of the signals A3-y is set to "1." If any one of the signals A3-y is found to be "1" ("YES" in step S18), the value y is inserted into a variable n4 and step S19 is reached. In step S19, the frame number is set to n4. Step S19 is followed by step S14. If none of the signals A3-y is found to be "1" in step S18 ("NO"), then step S20 is reached. In step S20, the frame number is incremented by 1. Step S20 is followed by step S14 from which the steps are repeated.

If any one of the signals A4-y is found to be "1" in step S15 ("YES"), then the value y is inserted into a variable n3 and step S16 is reached. In step S16, the frame number is set to n3. The demodulator 12 references the frame number n3, places the reproduced data accordingly to a suitable area in the SRAM 13, and goes to step S17.

In step S17, the sequencer 35 switches from mode 3 to mode 4. As a result, the signals A4-y alone are enabled and the signals A2-y and A3-y are disabled. Step S17 is followed by step S21.

In step S21, the sequencer 35 waits for the synchronizing signals to be read out. With the synchronizing signals retrieved, step S22 is reached. In step S22, a check is made to see if any one of the signals A4-y is set to "1." If any one of the signals A4-y is found to be "1" ("YES" in step S22), then the value y is inserted into n5 and step S23 is reached. In step S23, the frame number is set to n5. The demodulator 12 references the frame number n5, places the reproduced data accordingly to a suitable area in the SRAM 13, and returns to step S21 from which the steps are repeated. If none of the signals A4-y is found to be "1" ("NO" in step S22), then step S24 is reached in which the frame number is incremented by 1. Step S24 is followed by step S21 from which the steps are repeated.

The processing above allows frame numbers to be determined on the basis of the regularity of the synchronizing patterns included in blocks of data, thereby enabling reproduced data to be placed into suitable areas in the SRAM 13 in accordance with the determined frame numbers. This makes it possible to extract each block of data correctly. Because the extracted data is placed exactly where required in the SRAM 13, error correction is performed precisely on the reproduced data. It follows that data is reproduced correctly even from a smeared or otherwise blemished surface of the optical disk 10.

Another embodiment of the invention will now be described. Suppose that, as shown in FIG. 15, data reproduction has become impossible from the first frames in the third, fifth, seventh and ninth rows of the first sector due to a smeared or otherwise blemished surface of the optical disk 10. In that case, it is impossible to detect four consecutive synchronizing signals. As a result, the signals A4-y are all "0." This means that in the process of FIG. 14, steps S21 through S23 in mode 4 are incapable of correctly determining a frame number over the disk segment in question (i.e., the region corresponding to the four consecutive undetectable synchronizing signals).

Described below are a typical constitution and workings of the embodiment of the invention which will circumvent the contingency above and prevent erroneous detection of frame numbers.

Figure 16:
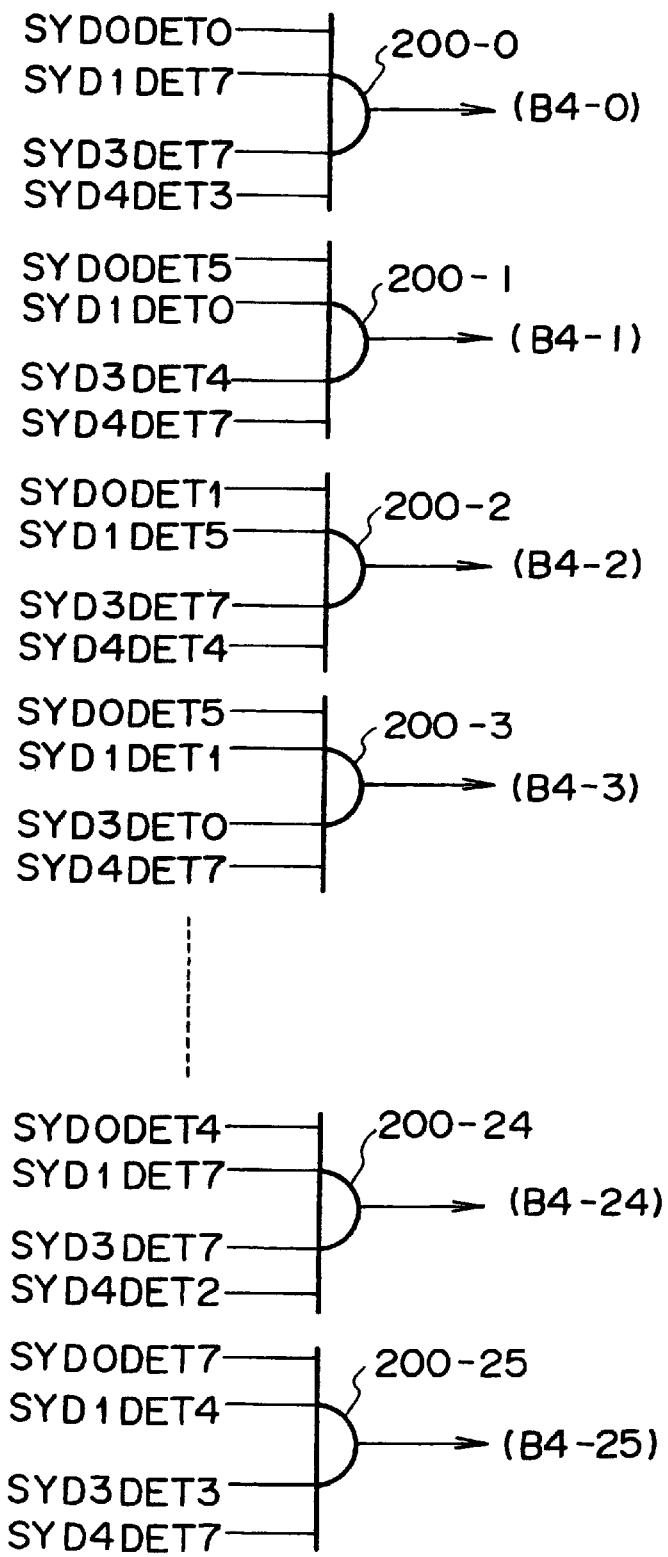
FIG. 16 is a view of another partial constitution of the consecutive coincidence detection circuit 55 in FIG. 8.

FIG. 16 is a view of another partial constitution of the consecutive coincidence detection circuit 55 in FIG. 8. The circuit arrangement shown here is designed to detect four synchronizing signals.

As shown in FIG. 16, the circuit portion that verifies whether four synchronizing signals are matched comprises AND circuits 200-0 through 200-25 each having four input terminals. The AND circuits 200-0 through 200-25 each receive, in a suitable combination, signals output from each of the synchronizing signal coincidence detection circuits 50, 51, 53 and 54 shown in FIG. 8. Illustratively, the AND circuit 200-0 receives signals SYD0DET0, SYD1DET7, SYD3DET7 and SYD4DET3 output from the synchronizing signal coincidence detection circuits 50, 51, 53 and 54 respectively. The AND circuit 200-0 has its output B4-0 set to "1" when all these input signals are found to be "1."

That is, the signals B4-y (y=0, 1, . . . , 25) are set to "1" when the following four synchronizing signals take on predetermined patterns:

(1) Synchronizing signal currently reproduced
(2) Synchronizing signal reproduced one signal earlier
(3) Synchronizing signal reproduced three signals earlier
(4) Synchronizing signal reproduced four signals earlier Described below with reference to FIG. 17 is a typical process involving the above signals B4-y. The process of FIG. 17, as with the process in FIG. 14, is carried out upon data reproduction from the optical disk 10.

In step S40 of FIG. 17, the sequencer 35 in the synchronizing signal determination circuit 34 of FIG. 6 enters standby mode (STBY). specifically, the sequencer 35 allows the signals A2-y through A4-y as well as B4-y from the consecutive coincidence detection circuit 55 in FIG. 8 to be all enabled and accepted. In step S41, the sequencer 35 waits for the synchronizing signals to be read out. With the synchronizing signals retrieved, step S42 is reached. In step S42, a check is made to see if any one of the signals A2-y is set to "1." If none of the signals A2-y is found to be "1" ("NO" in step S42), then step S41 is reached from which the steps are repeated. If any one of the signals A2-y is found to be "1" ("YES" in step S42), then the value y is inserted into the variable n0 and step S43 is reached.

In step S43, the frame number is set to n0. The demodulator 12 in FIG. 1 references that frame number, places the reproduced data accordingly into a suitable area in the SRAM 13, and goes to step S44.

In step S44, the sequencer 35 switches from standby mode to mode 2. Specifically, the sequencer 35 allows the signals A2-y through A4-y as well as B4-y to be all enabled and accepted. Step S44 is followed by step S45.

In step S45, the sequencer 35 waits for the synchronizing signals to be read out. With the synchronizing signals retrieved, step S46 is reached. In step S46, a check is made to see if any one of the signals A3-y is set to "1." That is, the sequencer 35 checks to see if any one of the outputs from the AND circuits 160-0 through 160-25 in FIG. 12 is in the "1"

state. If none of the signals A3-y is found to be "1" ("NO" in step S46), then step S48 is reached. In step S48, a check is made to see if any one of the signals B4-y is set to "1." If any one of the signals B4-y is found to be "1" ("YES" in step S48), then the value y is inserted into n6 and step S49 is reached. In step S49, the frame number is set to n6. At this point, the demodulator 12 in FIG. 1 places the reproduced data to a suitable area in the SRAM 13 in accordance with the frame number n6. Step S49 is followed by step S53.

If none of the signals B4-y is found to be "1" in step S48 ("NO"), then step S50 is reached. In step S50, a check is made to see if any one of the signals A2-y is set to "1." If any one of the signals A2-y is found to be "1" ("YES" in step S50), then the value y is inserted into n2 and step S51 is reached. In step S51, the frame number is set to n2. The demodulator 12 in FIG. 1 places the reproduced data into an appropriate area in the SRAM 13 in accordance with the frame number n2. Step S51 is followed by step S45 from which the steps are repeated. If none of the signals A2-y is found to be "1" in step S50 ("NO"), then step S52 is reached in which the frame number is incremented by 1. Step S52 is followed by step S45 from which the steps are repeated.

If any one of the signals A3-y is found to be "1" in step S46 ("YES"), then the value y is inserted into the variable n1 and step S47 is reached. In step S47, the frame number is set to n1. The demodulator 12 in FIG. 1 places the reproduced data into a suitable area in the SRAM 12 in accordance with the frame number n1. Step S47 is followed by step S53.

In step S53, the sequencer 35 switches from mode 2 to mode 3. Specifically, the sequencer 35 allows the signals A3-y, A4-y and B4-y to be enabled and accepted, and has the signals A2-y disabled. Step S53 is followed by step S54 in which the sequencer 35 waits for the synchronizing signals to be read out. With the synchronizing signals retrieved, step S55 is reached.

In step S55, a check is made to see if any one of the signals A4-y or B4-y is set to "1." If none of the signals A4-y or B4-y is found to be "1" ("NO" in step S55), then step S58 is reached. In step S58, a check is made to see if any one of the signals A3-y is set to "1." If any one of the checked signals is found to be "1" ("YES" in step S58), then the value y is inserted into the variable n4 and step S59 is reached. In step S59, the frame number is set to n4. The demodulator 12 in FIG. 1 references the frame number n4, places the reproduced data accordingly into a suitable area in the SRAM 13, and returns to step S54 from which the steps are repeated. If none of the signals A3-y is found to be "1" in step S58 ("NO"), then step S60 is reached. In step S60, the frame number is incremented by 1. Step S60 is followed by step S54 from which the steps are repeated.

If any one of the signals A4-y or B4-y is found to be "1" in step S55 ("YES"), then the value y is inserted into the variable n3 and step S56 is reached. In step S56, the frame number is set to n3. The demodulator 12 in FIG. 1 references the frame number n3, places the reproduced data accordingly to an appropriate area in the SRAM 13, and goes to step S57.

In step S57, the sequencer 35 switches from mode 3 to mode 4. Specifically, the sequencer 35 allows only the signals A4-y and B4-y to be enabled and accepted. Step S57 is followed by step S61.

In step S61, the sequencer 35 waits for the synchronizing signals to be read out. With the synchronizing signals retrieved, step S62 is reached. In step S62, a check is made to see if any one of the signals A4-y or B4-y is set to "1." If any one of the signals A4-y or B4-y is found to be "1"

("YES" in step S62), then the value y is inserted into n5 and step S63 is reached. In step S63, the frame number is set to n5. The demodulator 12 in FIG. 1 places the reproduced data into an appropriate area in the SRAM 13 in accordance with the frame number n5. Step S63 is followed by step S61 from which the steps are repeated.

If none of the signals A4-y or B4-y is found to be "1" in step S62 ("NO"), then step S64 is reached. In step S64, the frame number is incremented by 1. Step S64 is followed by step S61 from which the steps are repeated.

The processing above allows frame numbers to be determined even if there exist unreproducible synchronizing patterns as shown in FIG. 15. This makes it possible to reproduce and extract each block of data correctly even from a smeared or otherwise blemished surface of the optical disk 10 and to place the reproduced data one block at a time into correct areas in the SRAM 13. That in turn ensures reliable error correction, whereby data is reproduced unfailingly from the optical disk 10.

With the preceding embodiment, the B4-y signals are reproduced using synchronizing signals other than that reproduced two signals earlier (i.e., signal currently reproduced, signal reproduced one signal earlier, signal reproduced three signals earlier, signal reproduced four signals earlier). However, this embodiment is not limitative of the invention. Alternatively, the B4-y signals may be reproduced using synchronizing signals other than that reproduced one signal earlier. It is also possible to vary the number of synchronizing signals employed.

In step S55 or S62, the signals A4-y and B4-y are checked concurrently in a single step. Alternatively, the signals may be checked in different stages, as in steps S46 and S48.

The preamble part differs from the data frame part (ranging from the first through the sixteenth sectors) in terms of synchronizing pattern layout. Thus to determine frame numbers in the preamble part requires implementing a special process. Below is a description of a typical constitution and workings of a circuit for determining frame numbers in a transitory period ranging from the preamble part to the first sector (see FIG. 2).

Figure 18A:
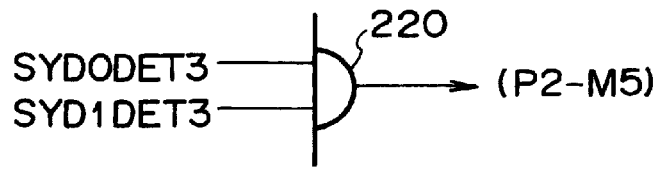
FIGS. 18A through 18E are views of typical constitutions of circuit arrangements that detect a preamble part.

FIGS. 18A through 18E are views showing typical constitutions of circuit arrangements that detect the preamble part. The preamble detection circuit comprises AND circuits 220 through 224 (preamble part detection means; preamble part detection step). FIG. 18A depicts a circuit that detects a synchronizing pattern SY3 of each of two frames in the second row of the preamble part. Specifically, the AND circuit 220 receives signals SYD0DET3 and SYD1DET3 from the synchronizing signal coincidence detection circuits 50 and 51 in FIG. 8. When the two input signals are both found to be "1" (SY3 of the second frame in the second row of the preamble is currently detected, with SY3 of the first frame detected one signal earlier), the AND circuit 220 has its output signal P2-M5 set to "1."

Figure 18B:
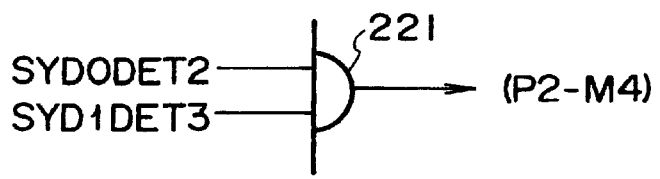
Figure 18C:
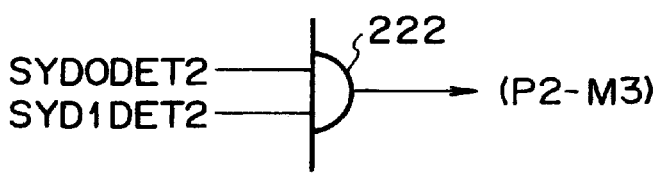
Figure 18D:
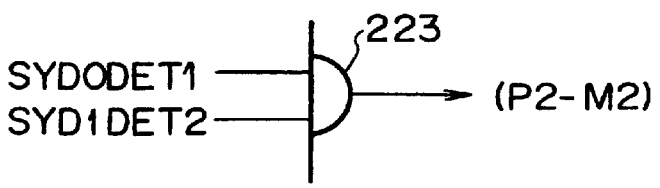
Figure 18E:
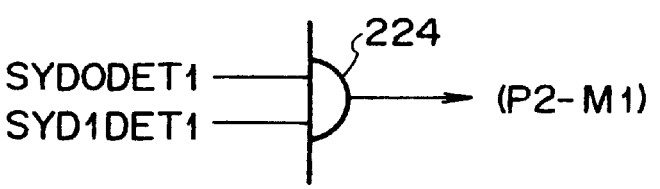

The circuit in FIG. 18B has its output signal P2-M4 set to "1" when SY3 of the second frame in the second row and SY2 of the first frame in the third row of the preamble part are detected. The circuit in FIG. 18C has its output signal P2-M3 set to "1" when SY2 of each of the first and second frames in the third row of the preamble part is detected. The circuit in FIG. 18D has its output signal P2-M2 set to "1" when SY1 of the second frame in the third row and SY1 of the first frame in the fourth row of the preamble part are detected. Furthermore, the circuit in FIG. 18E has its output signal P2-M1 set to "1" when SY1 of each of the first and second frames in the fourth row of the preamble part is detected.

The circuits above are incorporated in the consecutive coincidence detection circuit 55 of FIG. 8. In each of the output signals P2-M1 through P2-M5, the value "2" signifies that the signal in question is output when two consecutive synchronizing patterns are detected, and reference character M stands for "minus."

FIGS. 19A through 19I are views of circuit arrangements that detect frames having the frame number 0 in the first sector. The circuits in FIGS. 19A through 19C have their output signals Q2-0A through Q2-0C set to "1" when the synchronizing pattern SY0 of the first frame (with frame number 0) in the first sector is detected and when the second-, third- and fourth-last synchronizing patterns (SY1, SY2 and SY3 respectively) of the preamble part are detected.

Figure 19A:
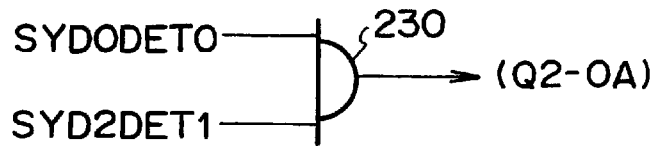
FIGS. 19A through 19I are views of typical constitutions of circuit arrangements that detect first synchronizing patterns of each sector.
Figure 19B:
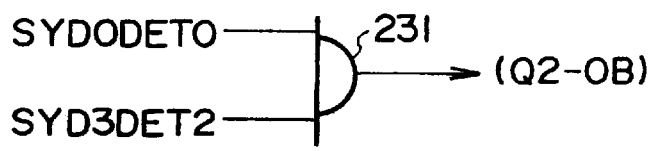
Figure 19C:
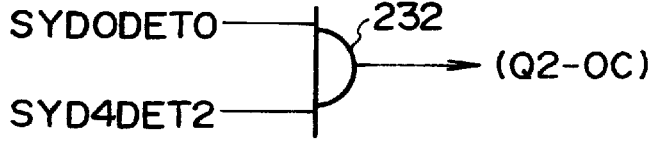
Figure 19D:
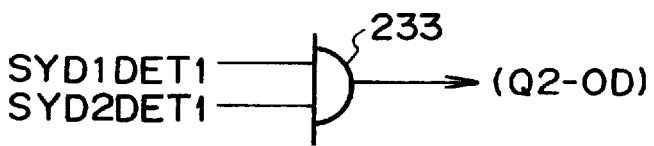
Figure 19E:
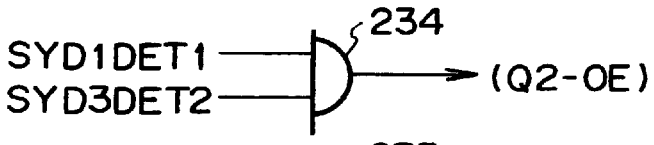
Figure 19F:
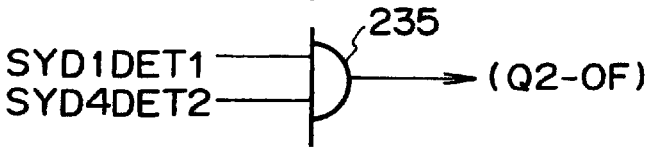

The circuits in FIGS. 19D through 19F have their output signals Q2-0D through Q2-0F set to "1" when the last synchronizing pattern SY1 of the preamble part is detected one signal earlier and when the second-, third- and fourth-last synchronizing patterns (SY1, SY2 and SY2) of the preamble part are detected two, three and four signals earlier respectively.

Figure 19G:
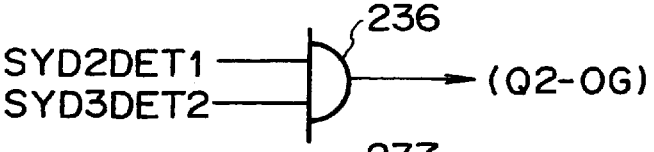
Figure 19H:
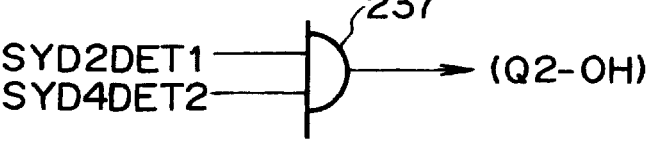

The circuits in FIGS. 19G and 19H have their output signals Q2-0G and Q2-0H set to "1" when the second-last synchronizing pattern SY1 of the preamble part is detected two signals earlier and when the third- or fourth-last synchronizing pattern (both SY2) of the preamble part is detected three or four signals earlier respectively.

Figure 19I:
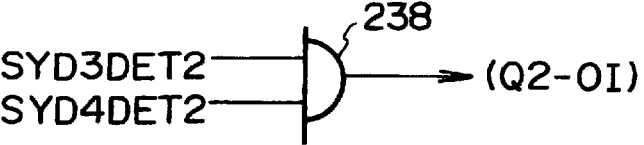

In addition, the circuit in FIG. 19I has its output signal Q2-0I set to "1" when the third-last synchronizing pattern SY2 of the preamble part is detected three signals earlier and the fourth-last synchronizing pattern SY4 is detected four signals earlier.

What follows is a description of how frames with the frame number 0 are detected from inside the first sector by use of the above-described circuits. The layout of synchronizing patterns in the preamble part of FIG. 2 differs from the layout in the data frame part. The difference requires that a special process be performed in determining frame numbers in the preamble part. The preamble part serves two purposes: as a region in which the coarse setting of a phase lock loop operation on data is performed, and as a region that overlaps with the previously recorded data in a data overwrite operation. As such, the preamble part is deemed inferior to the data frame part in terms of synchronizing pattern read-out precision. Because the preamble part has a narrow area, it is difficult to detect a large number of synchronizing patterns therefrom. For these reasons, a processing example below will be shown to identify a preamble part when two synchronizing patterns are detected.

FIG. 20 is a flowchart of steps constituting a typical process in which the circuit arrangements in FIGS. 18A through 18E and 19A through 19I detect frames with the frame number 0 in the first sector. The process is carried out when any one of the circuits in FIGS. 18A through 18E outputs "1" (i.e., when a preamble part is detected).

Suppose now that one of the circuits in FIGS. 18A through 18E has its output signal set to "1." In that case, the sequencer 35 first goes to step S80 to enter standby (STBY) mode. Specifically, the sequencer 35 allows the signals Q2-0A through Q2-0I shown in FIGS. 19A through 19I to be all enabled and accepted.

In step S81, the sequencer 35 waits for the synchronizing signals to be read out. With the synchronizing signals retrieved, step S82 is reached. In step S82, a check is made to see if any one of the output signals Q2-0A through Q2-0C from the circuits in FIGS. 19A through 19C is set to "1." If any one of the signals Q2-0A through Q2-0C is found to be "1" ("YES" in step S82), then step S88 is reached. If none of these signals is found to be "1" ("NO" in step S82), step S83 is reached.

In step S83, a check is made to see if any one of the output signals Q2-0D through Q2-0F from the circuits in FIGS. 19D through 19F is set to "1." If any one of the signals Q2-0D through Q2-0F is found to be "1" ("YES" in step S83), then step S88 is reached. If none of these signals is found to be "1" ("NO" in step S83), step S84 is reached.

In step S84, a check is made to see if any one of the output signals Q2-0G through Q2-0I from the circuits in FIGS. 19G through 19I is set to "1." If none of these signals is found to be "1" ("NO" in step S84), then step S85 is reached.

In step S85, a check is made to see if any one of the signals A2-y from the circuit arrangement in FIG. 11 is set to "1." If none of these signals is found to be "1" ("NO" in step S85), then step S81 is reached from which the steps are repeated. If any one of the signals A2-y is found to be "1" ("YES" in step S85), then the value y is inserted into the variable n0 and step S86 is reached.

In step S86, the frame number is set to n0. The demodulator 12 in FIG. 1 references the frame number n0, places the reproduced data accordingly into a suitable area in the SRAM 13, and goes to step S87. In step S87, the sequencer 35 switches from standby mode to mode 2. Specifically, the sequencer 35 allows the signals A2-y through A4-y to be all enabled and accepted. Step S87 is followed by step S45 in FIG. 17 from which mode 2 processing is carried out in the manner already described.

When any one of steps S82 through S84 yields a "YES" judgment, step S88 is reached in which the frame number is set to "0." At this point, the demodulator 12 in FIG. 1 judges that the first frame (with frame number 0) in the first sector is being reproduced. The demodulator 12 places the data reproduced from that point on successively into suitable areas in the SRAM 13.

In step S89, the sequencer 35 waits for the synchronizing signals to be read out. With the synchronizing signals retrieved, step S90 is reached. In step S90, a check is made to see if any one of the signals A2-y from the circuit arrangement in FIG. 11 is set to "1." If none of these signals is found to be "1" ("NO" in step S90), then step S93 is reached in which the frame number is incremented by 1. Step S93 is followed by step S89 from which the steps are repeated. If any one of the signals A2-y is found to be "1" in step S90 ("YES"), then the value y is inserted into the variable n0 and step S91 is reached. In step S91, the frame number is set to n0.

When any one of steps S82 through S84 yields a "YES" judgment, it means that the first frame (with frame number 0) in the first sector is detected. This generally causes the frame number to be set to "1" (i.e., n0=1).

In step S92, the sequencer 35 switches from standby mode to mode 2. Specifically, the sequencer 35 allows the signals A2-y through A4-y to be all enabled and accepted. The sequencer 35 then goes to step S45 in FIG. 17 from which mode 2 processing is carried out.

If the attempt to detect the first frame (with frame number 0) in the first sector fails in steps S82 through S84, step S85 is provided to detect a frame number in the sector. This procedure is devised so that even if detection of a first frame in the first sector has failed, data will be placed correctly into the SRAM 13 on the basis of the frame number first detected in the subsequent processing.

In step S80, the sequencer enters standby mode if the "1" state is detected in any one of the signals Q2-0A through Q2-0I in FIGS. 19A through 19I used to detect the first frame in the first sector. Selection of standby mode is also effected forcibly at the end of reproduction of the last frame (i.e., last frame of the sixteenth sector) in a given block of data.

The process described above allows each preamble part to be determined precisely through the detection of synchronizing patterns. This makes it possible to determine sectors with higher precision than before.

As many apparently different embodiments of this invention may be made without departing from the spirit and scope thereof, it is to be understood that the invention is not limited to the specific embodiments thereof except as defined in the appended claims.

What is claimed is:

1. A storage medium reproduction apparatus for reproducing data from a storage medium for storing data which are divided into frames of a predetermined length, each of said frames having a synchronizing pattern, said storage medium reproduction apparatus comprising:

synchronizing pattern detection means for detecting synchronizing patterns; and frame determination means for determining a frame number of a currently reproduced frame based on a regularity of at least two of the synchronizing patterns detected by said synchronizing pattern detection means, wherein the at least two synchronizing patterns are other than a current synchronizing pattern corresponding to said currently reproduced frame.

2. A storage medium reproduction apparatus according to claim 1, wherein said frame determination means determines the frame number of the currently reproduced frame on the basis of at least two consecutive synchronizing patterns detected by said synchronizing pattern detection means.

3. A storage medium reproduction apparatus according to claim 1, further comprising:

storage means for storing said data, said storage means further placing the frame determined by said frame determination means into an appropriate storage area.

4. A storage medium reproduction apparatus according to claim 1, wherein said frame determination means comprises:

(n−1) frame detection means, n being an integer of at least 3, each of said frame detection means detecting a frame based on a regularity of 2 to n consecutive synchronizing patterns, said frame determination means further determining the frame numbers in accordance with results of detection by said (n−1) frame detection means.

5. A storage medium reproduction apparatus according to claim 4, wherein said frame determination means has (n−1) operation modes which are selected consecutively every time one of the frame numbers is determined.

6. A storage medium reproduction apparatus according to claim 1, wherein, if said frame determination means fails to detect the frame number of the currently reproduced frame, said frame determination means estimates the current frame number based on a preceding synchronizing pattern and a subsequent synchronizing pattern.

7. A storage medium reproduction method for reproducing data from a storage medium for storing data which are divided into frames of a predetermined length, each of said frames having a synchronizing pattern, said storage medium reproduction method comprising the steps of:

detecting synchronizing patterns; and determining a frame number of a currently reproduced frame based on a regularity of at least two of the synchronizing patterns detected by the step of synchronizing pattern detection, wherein the at least two synchronizing patterns are other than a current synchronizing pattern corresponding to said currently reproduced frame.

8. A storage medium reproduction apparatus for reproducing data from a storage medium for storing data which are divided into frames of a predetermined length, a block including a plurality of said frames, each frame including a synchronizing pattern, each block having a preamble part, said storage medium reproduction apparatus comprising:

synchronizing pattern detection means for detecting synchronizing patterns;

preamble part detection means for detecting a preamble part based on a regularity of a first at least two of the synchronizing patterns detected by said synchronizing pattern detection means; and frame determination means for determining a frame number of a currently reproduced frame based on a regularity of a second at least two of the synchronizing patterns detected by said synchronizing pattern detection means, wherein the second at least two synchronizing patterns are other than a current synchronizing pattern corresponding to said currently reproduced frame.

9. A storage medium reproduction apparatus according to claim 8, wherein said preamble part detection means detects said preamble part in accordance with a regularity of two consecutive synchronizing patterns detected by said synchronizing pattern detection means.

10. A storage medium reproduction apparatus according to claim 8, wherein said frame determination means comprises:

(n–1) frame detection means, n being an integer of at least 3, each of said frame detection means detecting a frame based on a regularity of 2 to n consecutive synchronizing patterns, wherein said frame determination means has (n–1) operation modes which are selected consecutively every time one of the frame numbers is determined, said frame determination means further entering a first operation mode when said preamble part is detected by said preamble part detection means.

11. A storage medium reproduction method for reproducing data from a storage medium for storing data which are divided into frames of a predetermined length, a block including a plurality of said frames, each frame including a synchronizing pattern, each block having a preamble part, said storage medium reproduction method comprising the steps of:

detecting synchronizing patterns;

detecting a preamble part based on a regularity of a first of at least two of the synchronizing patterns detected by the step of synchronizing pattern detection; and determining a frame number of a currently reproduced frame based on a regularity of a second of at least two of the synchronizing patterns detected by the step of synchronizing pattern detection, wherein the second at least two synchronizing patterns are other than a current synchronizing pattern corresponding to said currently reproduced frame.

12. A storage medium reproduction apparatus for reproducing data from a storage medium for storing data which are divided into frames of a predetermined length, each of said frames having a synchronizing pattern, said storage medium reproduction apparatus comprising:

a synchronizing signal detection circuit configured to detect synchronizing patterns; and a synchronizing signal determination circuit configured to determine a frame number of a currently reproduced frame based on a regularity of at least two of the synchronizing patterns detected by said synchronizing signal detection circuit, wherein the at least two synchronizing patterns are other than a current synchronizing pattern corresponding to said currently reproduced frame.

13. A storage medium reproduction apparatus according to claim 12, wherein said synchronizing signal determination circuit is further configured to determine the frame number of the currently reproduced frame on the basis of at least two consecutive synchronizing patterns detected by said synchronizing signal detection circuit.

14. A storage medium reproduction apparatus according to claim 12, further comprising:

a memory circuit configured to store said data, said memory circuit being further configured to place the frame determined by said synchronizing signal determination circuit into an appropriate storage area.

15. A storage medium reproduction apparatus according to claim 12, wherein said synchronizing signal determination circuit comprises:

(n–1) consecutive coincidence detection circuits, n being an integer of at least 3, each of said consecutive coincidence detection circuits being configured to detect a frame based on a regularity of 2 to n consecutive synchronizing patterns, said synchronizing signal determination circuit being further configured to determine the frame numbers in accordance with results of detection by said (n–1) consecutive coincidence detection circuits.

16. A storage medium reproduction apparatus according to claim 15, wherein said synchronizing signal determination circuit has (n–1) operation modes which are selected consecutively every time one of the frame numbers is determined.

17. A storage medium reproduction apparatus according to claim 12, wherein, if said synchronizing signal determination circuit fails to detect the frame number of the currently reproduced frame, said synchronizing signal determination circuit is further configured to estimate the current frame number based on a preceding synchronizing pattern and a subsequent synchronizing pattern.

18. A storage medium reproduction apparatus for reproducing data from a storage medium for storing data which are divided into frames of a predetermined length, a block including a plurality of said frames, each frame including a synchronizing pattern, each block having a preamble part, said storage medium reproduction apparatus comprising:

a synchronizing signal detection circuit configured to detect synchronizing patterns;

a preamble detection circuit configured to detect a preamble part based on a regularity of a first at least two of the synchronizing patterns detected by said synchronizing signal detection circuit; and a synchronizing signal determination circuit configured to determine a frame number of a currently reproduced frame based on a regularity of a second at least two of the synchronizing patterns detected by said synchronizing signal detection circuit, wherein the second at least two synchronizing patterns are other than a current synchronizing pattern corresponding to said currently reproduced frame.

19. A storage medium reproduction apparatus according to claim 18, wherein said preamble detection circuit is further configured to detect said preamble part in accordance with a regularity of two consecutive synchronizing patterns detected by said synchronizing signal detection circuit.

20. A storage medium reproduction apparatus according to claim 18, wherein said synchronizing signal determination circuit comprises:

(n−1) consecutive coincidence detection circuits, n being an integer of at least 3, each of said consecutive coincidence detection circuits being configured to detect a frame based on a regularity of 2 to n consecutive synchronizing patterns, wherein said synchronizing signal determination circuit has (n−1) operation modes which are selected consecutively every time one of the frame numbers is determined, said synchronizing signal determination circuit being further configured to enter a first operation mode when said preamble part is detected by said preamble part detection means.

* * * * *